(12) United States Patent
Ikeda et al.

(10) Patent No.: US 10,553,099 B2
(45) Date of Patent: Feb. 4, 2020

(54) INFORMATION PROVIDING APPARATUS AND INFORMATION PROVIDING SYSTEM

(71) Applicants: Hajimu Ikeda, Kanagawa (JP);
Toshihiro Atsumi, Kanagawa (JP);
Shotaro Komoto, Kanagawa (JP)

(72) Inventors: Hajimu Ikeda, Kanagawa (JP);
Toshihiro Atsumi, Kanagawa (JP);
Shotaro Komoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/048,552

(22) Filed: Jul. 30, 2018

(65) Prior Publication Data

US 2019/0043336 A1    Feb. 7, 2019

(30) Foreign Application Priority Data

Aug. 7, 2017  (JP) .................................. 2017-152670
Mar. 9, 2018  (JP) .................................. 2018-043623

(51) Int. Cl.
*G08B 21/22*  (2006.01)
*G08B 21/02*  (2006.01)
(Continued)

(52) U.S. Cl.
CPC ............ *G08B 21/22* (2013.01); *G01J 5/0025* (2013.01); *G01V 9/005* (2013.01); *G08B 21/02* (2013.01);
(Continued)

(58) Field of Classification Search
CPC ...... G08B 21/22; G08B 21/02; G08B 25/001; G01J 5/0025; G01J 2005/0077; G01J 2005/0085; G01V 9/005
See application file for complete search history.

(56) References Cited

U.S. PATENT DOCUMENTS

2006/0145874 A1* 7/2006 Fredriksson ......... G08B 21/043
340/573.1
2012/0081545 A1* 4/2012 Jin ........................... H04N 7/18
348/141

(Continued)

FOREIGN PATENT DOCUMENTS

JP        2000-316915        11/2000
JP        2015132963  A  *  7/2015
(Continued)

*Primary Examiner* — James J Yang
*Assistant Examiner* — Kevin Lau
(74) *Attorney, Agent, or Firm* — IPUSA, PLLC

(57) ABSTRACT

An information providing apparatus for providing information of a user who uses a bed placed in a facility includes a memory; and a processor coupled to the memory and configured to collect image data indicating temperatures on the bed and temperatures around the bed from an acquisition device, the image data being acquired by the acquisition device, detect, based on the collected image data, a change of a given temperature in one or more detection areas preset on the bed and around the bed, and send the information of the user to predetermined notification destination, based on the change of the given temperature indicated by the image data in the one or more detection areas detected as corresponding to a preset pattern of change of the given temperature.

16 Claims, 32 Drawing Sheets

(51) Int. Cl.
*G08B 25/00* (2006.01)
*G01J 5/00* (2006.01)
*G01V 9/00* (2006.01)

(52) U.S. Cl.
CPC .... *G08B 25/001* (2013.01); *G01J 2005/0077* (2013.01); *G01J 2005/0085* (2013.01)

(56) References Cited

U.S. PATENT DOCUMENTS

| | | | | |
|---|---|---|---|---|
| 2012/0253142 | A1* | 10/2012 | Meger | A61B 5/1116 |
| | | | | 600/301 |
| 2013/0127620 | A1* | 5/2013 | Siebers | G08B 21/02 |
| | | | | 340/573.1 |
| 2015/0112151 | A1* | 4/2015 | Muhsin | A61B 5/002 |
| | | | | 600/301 |
| 2017/0061090 | A1 | 3/2017 | Itoh | |
| 2017/0116484 | A1* | 4/2017 | Johnson | G06K 9/00771 |

FOREIGN PATENT DOCUMENTS

| | | |
|---|---|---|
| JP | 2017-049831 | 3/2017 |
| WO | 2014/185406 | 11/2014 |

\* cited by examiner

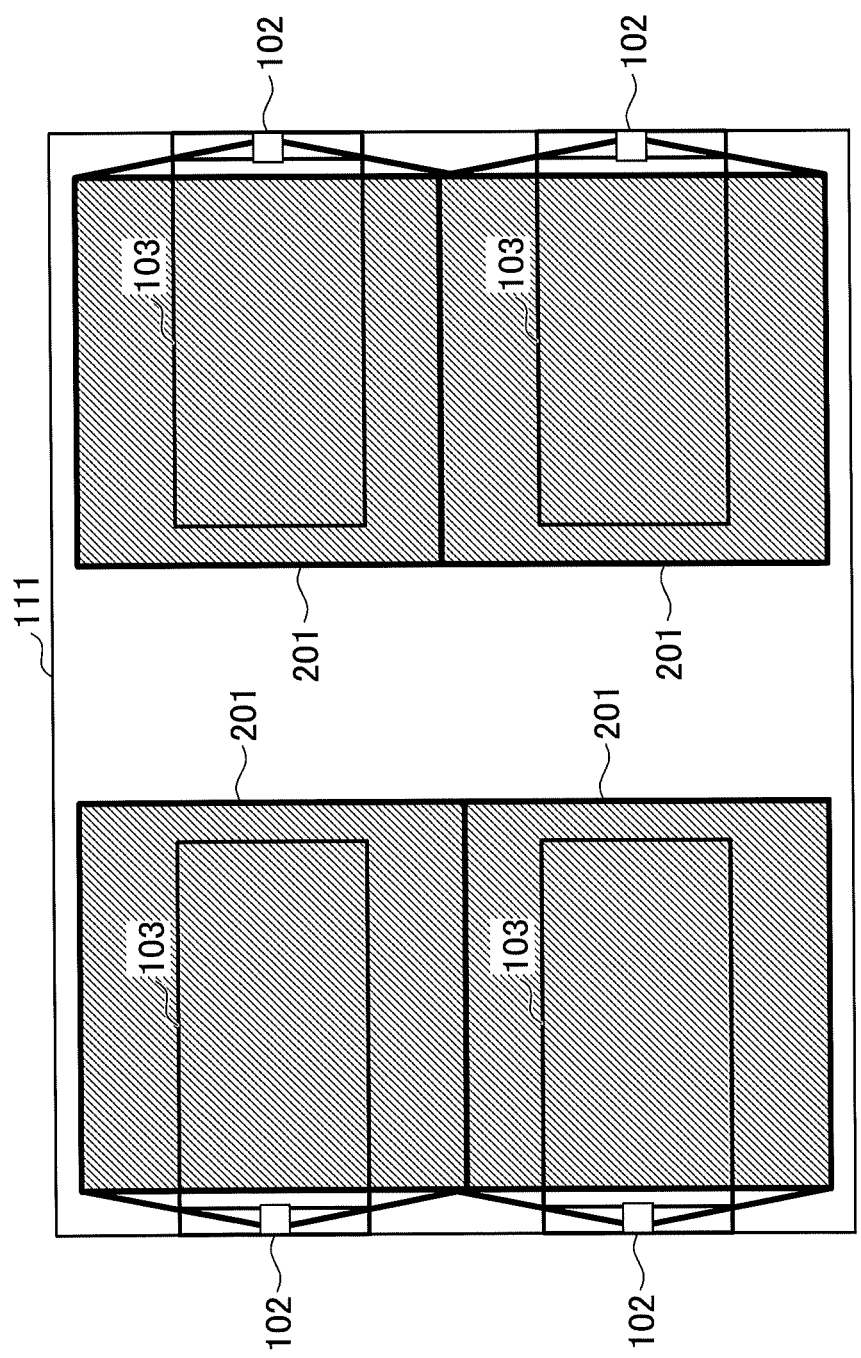

| DETECTION PATTERN | NOTIFICATION DESCRIPTION | CHANGE OF TEMPERATURE | ... |
|---|---|---|---|
| PATTERN 1 | BED-LEAVING DETECTION INFORMATION + IMAGE DATA | DETECTION TARGET MOVES TO OUTSIDE OF DETECTION RANGE | ... |
| PATTERN 2 | FALL DETECTION INFORMATION + IMAGE DATA | 1) DETECTION TARGET MOVES FROM BED TO FALL DETECTION AREA<br>2) DETECTION TARGET REMAINS IN FALL DETECTION AREA EXCEEDING A PREDETERMINED PERIOD OF TIME | ... |
| PATTERN 3 | FALL CAUTION INFORMATION + IMAGE DATA | DETECTION TARGET MOVES TO CAUTION AREA A | ... |
| PATTERN 4 | GETTING-UP CAUTION INFORMATION + IMAGE DATA | DETECTION TARGET MOVES TO CAUTION AREA B | ... |
| PATTERN 5 | BED-LEAVING CAUTION INFORMATION + IMAGE DATA | DETECTION TARGET MOVES TO CAUTION AREA C | ... |
| PATTERN 6 | RETURN DETECTION INFORMATION + IMAGE DATA | 1) DETECTION TARGET MOVES FROM OUTSIDE OF DETECTION RANGE TO INSIDE OF DETECTION RANGE<br>2) DETECTION TARGET ENTERS CAUTION AREA<br>3) DETECTION TARGET MOVES FROM CAUTION AREA TO FALL DETECTION AREA AGAIN | ... |
| ... | ... | ... | ... |

EXAMPLE OF ASSOCIATION INFORMATION

FIG.8B

| AREA | ATTRIBUTE | COORDINATE RANGE 712 |
|---|---|---|
| AREA 1 | DETECTION RANGE | (x11, y11), (x12, y12), (x13, y13), (x14, y14) |
| AREA 2 | FALL DETECTION AREA | (x21, y21), (x22, y22), (x23, y23), (x24, y24) |
| AREA 3 | CAUTION AREA A | (x31, y31), (x32, y32), (x33, y33), (x34, y34) |
| ... | ... | ... |

EXAMPLE OF AREA INFORMATION

FIG.8C

| AREA | AREA NAME | DETECTION RANGE | SUBAREA |
|---|---|---|---|
| AREA 1 | FALL DETECTION AREA | | A1, B1, C1, ..., A2, B2, C2, ... |
| AREA 2 | | | B1, C1, D1, ..., B2, C2, D2, ... |
| AREA 3 | CAUTION AREA A | | G5, H5, I5, ..., G6, H6, I6, ... |
| ... | ... | | ... |

712

ANOTHER EXAMPLE OF AREA INFORMATION

| CAMERA ID | TIME POINT | DETECTION FRAME | ... |
|---|---|---|---|
| 10001 | 00:00:00 | E3 | ... |
| | 02:05:43 | E1 | ... |
| | 02:07:11 | E3 | ... |
| | 05:35:33 | C3 | ... |
| | 05:35:35 | B3 | ... |
| | 05:35:40 | B2, C2 | ... |
| | 05:35:43 | B1, C1 | ... |
| | 05:35:45 | – | ... |
| | 05:35:49 | C1 | ... |
| | ... | ... | ... |
| 10002 | ... | ... | ... |
| ... | ... | ... | ... |

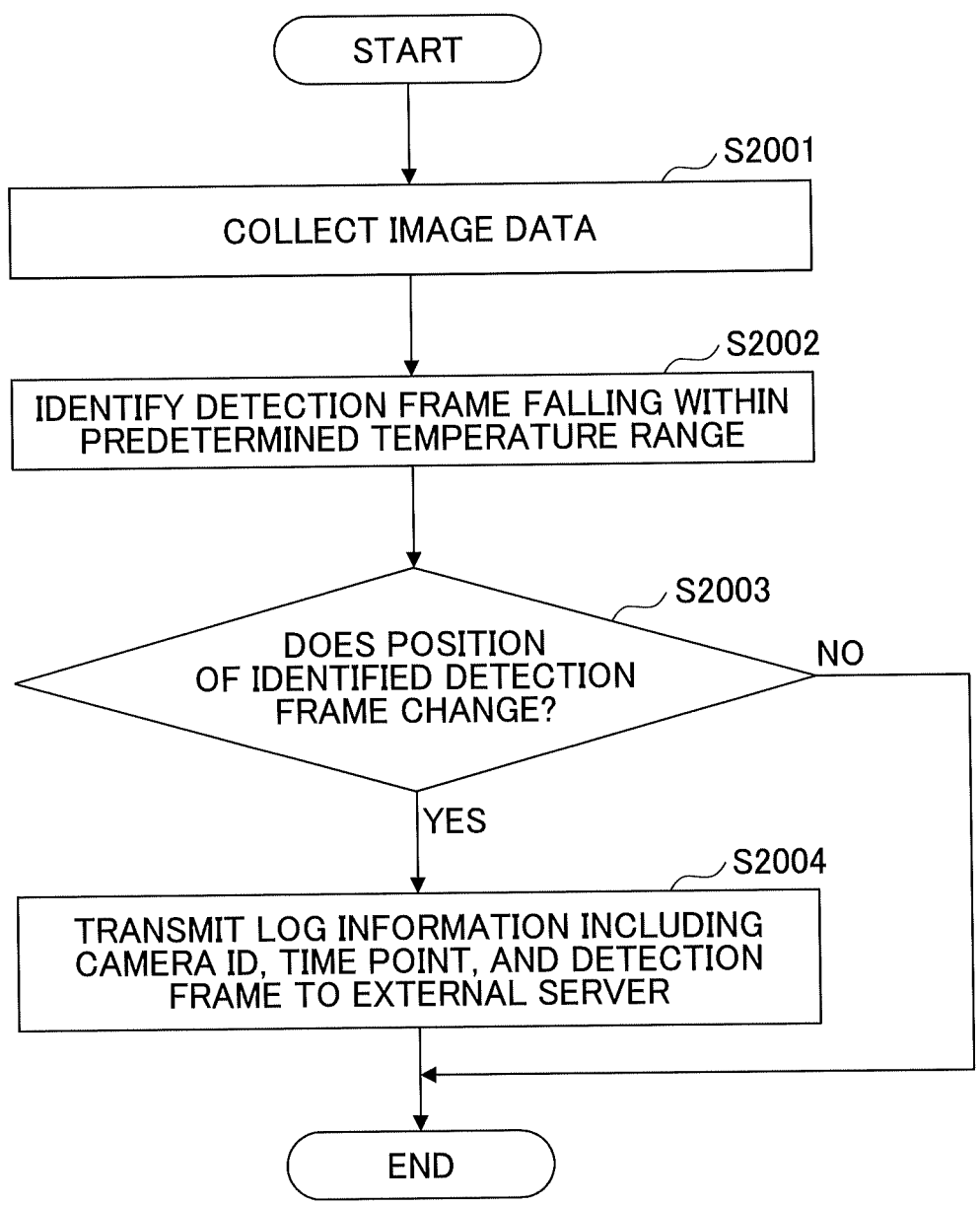

FIG.22A

| | SLEEPING STATE | FALL RISK STATE | GETTING-UP STATE | PERCHED-ON-BED STATE | LEAVING-BED STATE | SITTING-ON-BED STATE | FALL STATE | ABSENCE STATE |
|---|---|---|---|---|---|---|---|---|
| DETECTION STATE | STATE IN WHICH HEAD IS DETECTED IN UPPER-MIDDLE PORTION OF BED | STATE IN WHICH HEAD IS DETECTED IN UPPER-EDGE PORTION OF BED | STATE IN WHICH HEAD IS DETECTED IN MIDDLE PORTION OF BED | STATE IN WHICH HEAD IS DETECTED IN MIDDLE EDGE PORTION OF BED | STATE IN WHICH HEAD IS DETECTED OUTSIDE OF BED | STATE IN WHICH HEAD IS DETECTED IN MIDDLE EDGE PORTION OF BED/ TO DISTINGUISH FROM PERCHED-ON-BED STATE, DETECTION SEQUENCE IS CHECKED | STATE IN WHICH HEAD IS DETECTED OUTSIDE OF BED/ TO DISTINGUISH FROM LEAVING-BED STATE, DURATION OF DETECTION STATE IS CHECKED | STATE IN WHICH HEAD IS NOT DETECTED IN ENTIRE DETECTION AREA |
| DETECTION FRAME | E3 | E2 | B3, C3 | B2, C2 | B1, C1 | B2, C2 | B1, C1 | NO DETECTION |

FIG.22B

| TIME POINT | DETECTION FRAME | DETECTION STATE |
|---|---|---|
| 00:00:00 | E3 | SLEEPING STATE |
| 02:05:43 | E1 | FALL RISK STATE |
| 02:07:11 | E3 | SLEEPING STATE |
| 05:35:33 | C3 | GETTING-UP STATE |
| 05:35:35 | B3 | GETTING-UP STATE |
| 05:35:40 | B2, C2 | PERCHED-ON-BED STATE |
| 05:35:43 | B1, C1 | LEAVING-BED STATE |
| 05:35:45 | – | ABSENCE STATE |
| 05:35:49 | C1 | SITTING-ON-BED STATE |
| ... | ... | ... |

《RATIO OF PRESENCE TO ABSENCE》

《HEAT MAP OF LENGTHS OF TIME》

《HEAT MAP OF FREQUENCY OF MOVEMENTS》

INFORMATION PROVIDING APPARATUS AND INFORMATION PROVIDING SYSTEM

CROSS-REFERENCE TO RELATED APPLICATION

The present application claims priority under 35 U.S.C. § 119 to Japanese Patent Application No. 2017-152670, filed on Aug. 7, 2017, and Japanese Patent Application No. 2018-043623, filed on Mar. 9, 2018, the entire contents of which are incorporated herein by reference.

BACKGROUND OF THE INVENTION

1. Field of the Invention

The disclosures herein generally relate to an information providing apparatus and an information providing system.

2. Description of the Related Art

An information providing apparatus that provides information on situations of each user who uses a bed (such as leaving the bed, falling out of the bed, and being likely to fall out of the bed) in a facility such as a medical facility or a nursing facility is known.

For example, a nursing care support apparatus is known. The nursing care support apparatus determines whether a care-receiver requires care by using a plurality of weight detecting elements disposed at lower portions of a bed to detect weight, and displays a determination result when the care-receiver is determined to require care (see Patent Document 1, for example).

A technique disclosed in Patent Document 1 requires a special bed equipped with the weight detecting elements, and also false detection may occur due to malfunction or a failure of a sensor, failing to sufficiently reduce the burden of ward rounds conducted at night by personnel such as nurses and caregivers.

Further, for example, in a system that uses typical monitoring cameras, personnel such as nurses and caregivers are required to monitor video of the monitoring cameras, and thus have difficulty in checking situations of users on beds, especially after lights-out.

As described, in the conventional technique, it is difficult to accurately grasp situations of users on beds placed in a facility such as a medical facility or a nursing facility.

Related-Art Documents

[Patent Document 1] Japanese Unexamined Patent Application Publication NO. 2000-316915

SUMMARY OF THE INVENTION

According to at least one embodiment, an information providing apparatus for providing information of a user who uses a bed placed in a facility includes a memory; and a processor coupled to the memory and configured to collect image data indicating temperatures on the bed and temperatures around the bed from an acquisition device, the image data being acquired by the acquisition device, detect, based on the collected image data, a change of a given temperature in one or more detection areas preset on the bed and around the bed, and send the information of the user to a predetermined notification destination based on the change of the given temperature indicated by the image data in the one or more detection areas detected as corresponding to a preset pattern of a change of the given temperature.

BRIEF DESCRIPTION OF THE DRAWINGS

FIGS. 2A and 2B are diagrams illustrating examples of arrangement of beds and cameras according to an embodiment;

FIGS. 8A through 8C are diagrams illustrating examples of information managed by the information providing apparatus according to an embodiment;

FIG. 20 is a flowchart illustrating an example of a process for transmitting log information according to the fifth embodiment;

FIGS. 22A and 22B are diagrams for explaining examples of an analysis result according to the fifth embodiment;}

DESCRIPTION OF THE PREFERRED EMBODIMENTS

In the following, embodiments of the present invention will be described with reference to the accompanying drawings.

According to at least one embodiment, it is possible to accurately grasp states of users who use beds placed in a facility such as a medical facility or a nursing facility.

<System Configuration>

Figure 1A:
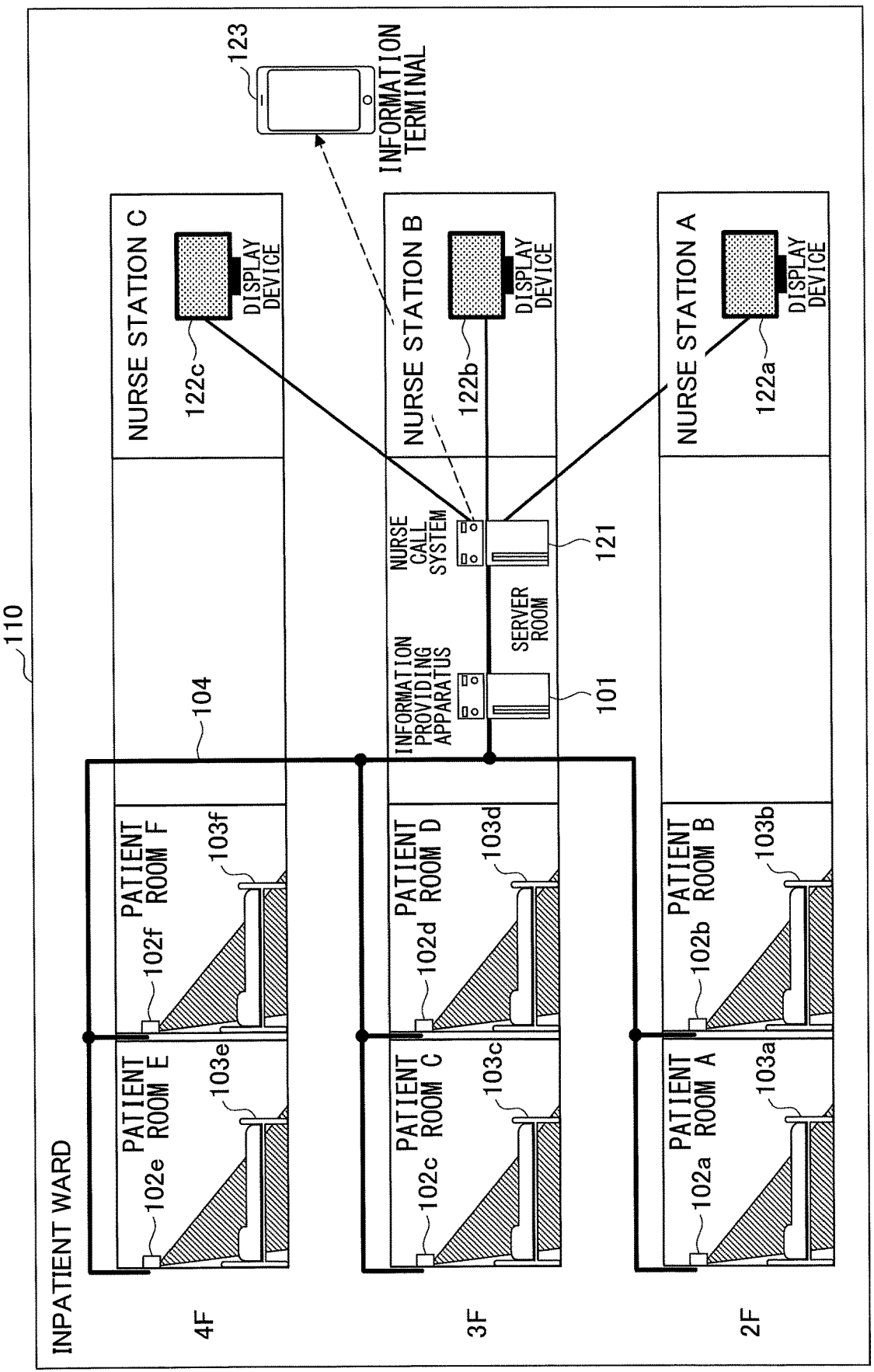
FIG. 1A is a diagram illustrating an example of a system configuration of an information providing system according to an embodiment.

FIG. 1A is a diagram illustrating an example of a system configuration of an information providing system according to an embodiment. An information providing system 100 includes, for example, a plurality of cameras 102a through 102f and an information providing apparatus 101 coupled to the plurality of cameras 102a through 102f via a network 104, all of which are installed in an inpatient ward 110 as an example of a medical facility or a nursing facility.

The number of the cameras 102 illustrated in FIG. 1A is merely an example. The number of the cameras 102 may be any number greater than or equal to 1. In the following description, in order to refer to any one of the plurality of cameras 102a through 102f, the term "camera 102" is used.

The camera 102 (the acquisition device) is an imaging device configured to acquire image data indicating temperatures of an object. For example, a generally common infrared thermography camera (hereinafter referred to as the thermography camera) may be adopted. The thermography camera is a device that forms an image by converting infrared radiation from an object to be measured into temperature readings so as to visualize the temperature distribution by color. The thermography camera may also be sometimes referred to as thermography, thermo-vision, and thermo-viewer.

In the example of FIG. 1A, the plurality of cameras 102a through 102f are respectively installed, in one-to-one correspondence with a plurality of beds 103a through 103f respectively placed in patient rooms A through F, on walls or ceilings of the patient rooms A through F. For example, the camera 102a is installed on the wall surface of the bed 103a provided in the patient room A so as to acquire image data indicating temperatures on the bed 103a and temperatures around the bed 103a.

Further, the camera 102a acquires the image data indicating the temperatures on the bed 103a and temperatures around the bed 103a at a predetermined frame rate (for example, 5 fps to 1 fps), and transmits the acquired image data to the information providing apparatus 101 via the network 104. The image data acquired by the camera 102a is not limited to moving image data, and may be still image data acquired at predetermined time intervals (at intervals of 10 seconds to 60 seconds, for example).

At this time, the image data transmitted from the camera 102a includes identification information (for example, an IP address, a camera ID, and a bed ID) for identifying the camera 102a and the bed 103a.

In this way, the plurality of cameras 102a through 102f each obtain image data indicating temperatures on the corresponding bed and around the corresponding bed, and transmit the obtained image data to the information providing apparatus 101 via the network 104, together with identification information.

The information providing apparatus 101 is, for example, an information processing apparatus such as a personal computer (PC) or a system including a plurality of information processing apparatuses. The information providing apparatus 101 collects image data transmitted from the camera 102, and detects, from the collected image data, a change of a predetermined temperature in one or more detection areas preset on the corresponding bed and around the corresponding bed. Further, when a preset pattern of a change of the predetermined temperature is detected in the one or more detection areas, the information providing apparatus 101 sends information indicating a state of a user (a patient or a care-receiver, for example) who uses a bed a predetermined notification destination (for example, a nurse call system 121).

The nurse call system 121 is, for example, an information processing apparatus such as a PC or a system including a plurality of information processing apparatuses. The nurse call system 121 is an example of a predetermined notification destination that is set for the information providing apparatus 101. The nurse call system 121 causes display devices 122a through 122c, which are respectively placed in nurse stations A through C, or causes one or more information terminals 123 possessed by personnel such as nurses and caregivers to display information on calls by users (such as patients and care-receivers) who use the beds 103.

Also, as illustrated in FIG. 1A, the nurse call system 121 according to the present embodiment is coupled to the information providing apparatus 101 via the network 104, and receives the information of a user sent by the information providing apparatus 101. Further, the based on the information of the user that was received, the nurse call system 121 causes the display devices 122a through 122c and one or more information terminals 123 to display screen data for displaying the user's state.

The plurality of display devices 122a through 122c are display devices placed in the nurse stations, for example, and display the screen data sent from the nurse call system 121.

The information terminals 123 are information processing apparatuses such as smartphones, tablet terminals, and laptop computers possessed by personnel such as nurses and caregivers. The information terminals 123 may communicate with the nurse call system 121 through wireless communication, and display the screen data sent from the nurse call system 121 by executing a predetermined application program (hereinafter referred to as the application).

Figure 1B:
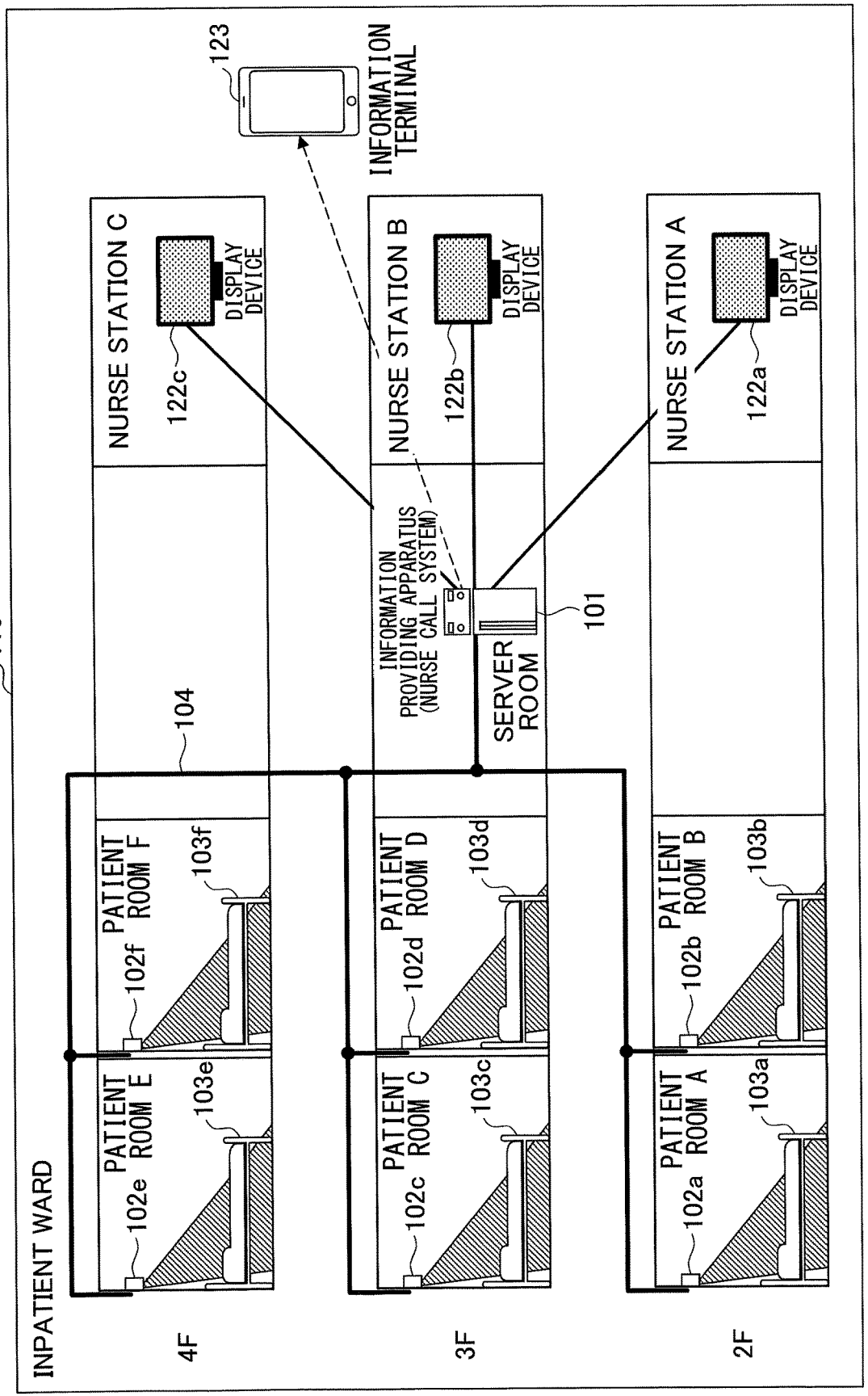
FIG. 1B is a diagram illustrating an example of a system configuration of an information providing system according to an embodiment.

As illustrated in FIG. 1B, the nurse call system 121 may be integrated into the information providing apparatus 101. For example, functions of the information providing apparatus 101 may be implemented by a nurse call system compatible with a facility such as the inpatient ward 110.

(Examples of Arrangement of Beds and Cameras)

Figure 2A:
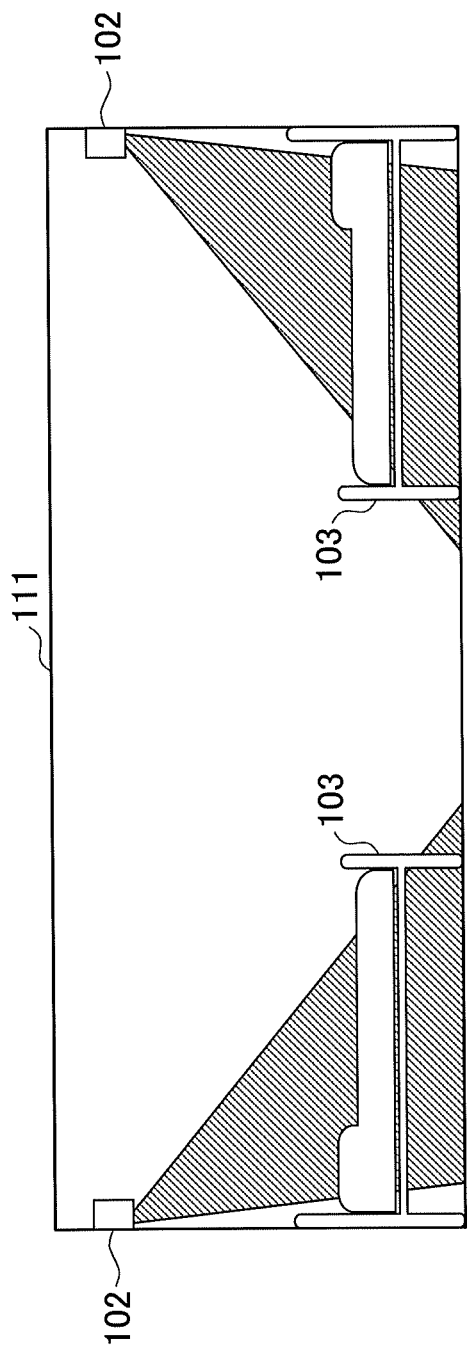

FIGS. 2A and 2B are diagrams illustrating examples of arrangement of beds and cameras according to an embodiment. As illustrated in FIG. 2A, the plurality of cameras 102 are each installed on the wall of a patient room 111 so as to acquire image data of the corresponding bed 103 and around the corresponding bed 103. Further, the plurality of cameras 102 may be installed on the ceiling of the patient room 111.

FIG. 2B illustrates the patient room 111 viewed from above. The plurality of cameras 102 are each installed so as to acquire image data in a predetermined range (hereinafter referred to a detection range 201) of the corresponding bed 103 and around the corresponding bed 103.

(Example of Detection Area)

Figure 3A:
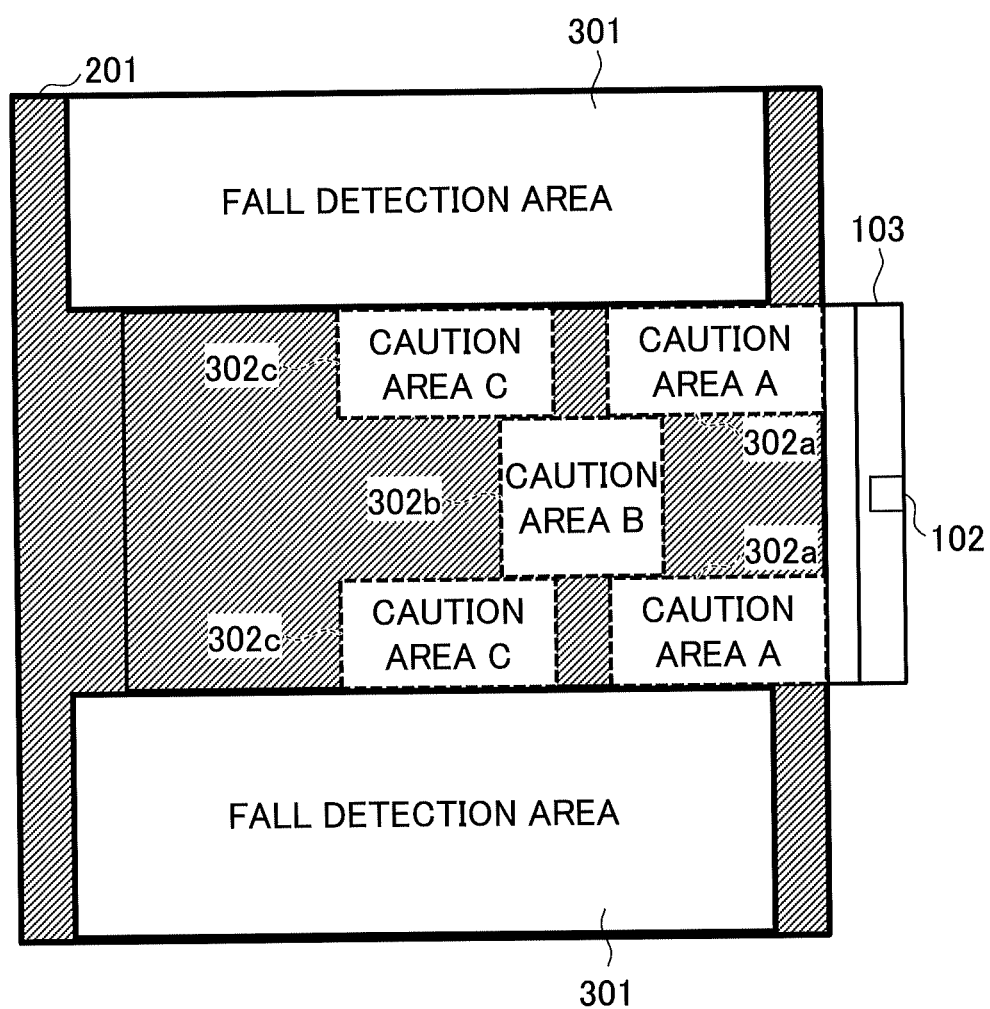
FIGS. 3A and 3B are diagrams illustrating examples of detection areas according to an embodiment.
Figure 3B:
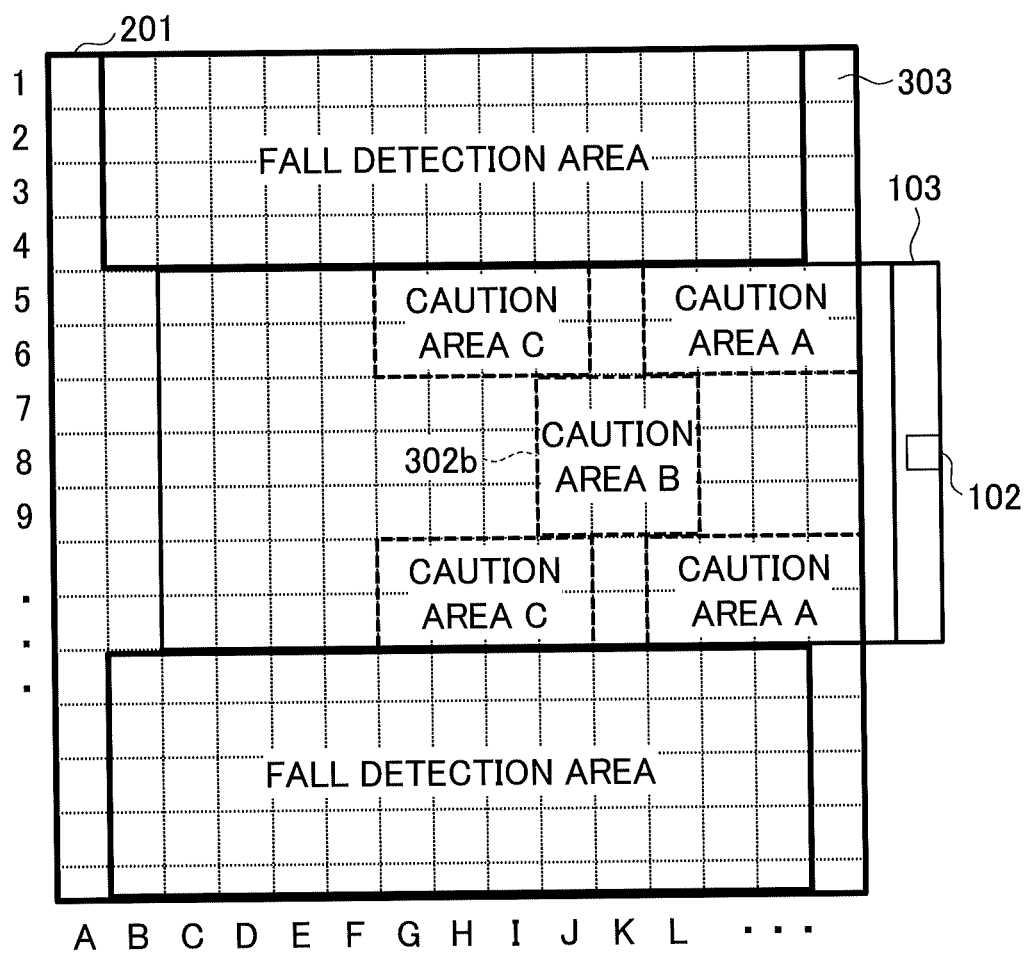

FIGS. 3A and 3B are diagrams illustrating examples of detection areas according to an embodiment. The information providing apparatus 101 manages one or more detection areas preset in the detection range 201 of the given camera 102. For example, as illustrated in FIG. 3A, a plurality of detection areas are preset in the detection range 201 of the camera 102. In the example of FIG. 3A, fall detection areas 301, caution areas A302*a*, a caution area B302*b*, and caution areas C302*c* are set in the detection range 201.

For example, the information providing apparatus 101 may manage the detection areas by using coordinate information of image data acquired by the camera 102.

Preferably, the information providing apparatus 101 manages the detection range 201 of the image data acquired by the camera 102 by dividing the detection range 201 into meshed subareas 303 as illustrated in FIG. 3B. For example, the information providing apparatus 101 may manage the detection areas by using information (1, 2, 3, etc.) indicating positions in a vertical direction and information (A, B, C, etc.) indicating positions in a horizontal direction. As an example, in FIG. 3B, the caution area B302*b* may be represented by information (J7, K7, L7, J8, K8, L8, J9, K9, and L9) indicating a plurality of subarea positions. In this way, the information providing apparatus 101 can easily manage a change of a predetermined temperature in the one or more detection areas.

(Example of Detection Pattern)

The information providing apparatus 101 detects a change of a predetermined temperature in the one or more detection areas, based on image data acquired by the camera 102. When the change of the predetermined temperature is detected as corresponding to a preset detection pattern, the information providing apparatus 101 sends information on a user's state to a predetermined notification destination.

Figure 4A:
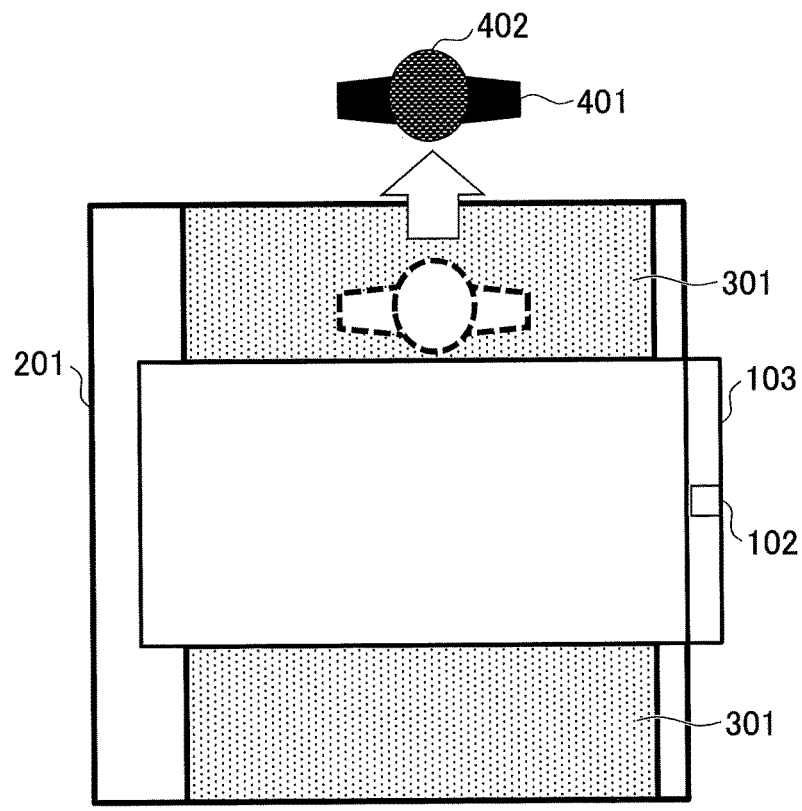
FIGS. 4A and 4B are diagrams illustrating examples of detection patterns according to an embodiment.

FIGS. 4A and 4B and FIGS. 5A through 5C are diagrams illustrating detection patterns according to an embodiment. FIG. 4A illustrates an example of a bed-leaving detection pattern for detecting a user 401, such as a patient or a care-receiver who uses the bed 103, leaving the bed 103. For example, when a temperature corresponding to the user 401's temperature previously detected on the bed 103 is detected in one of the fall detection areas 301, and subsequently becomes no longer detected in the detection range 201 within a predetermined period of time, the providing apparatus 101 determines (detects) that the user has left the bed.

In this case, the information providing apparatus 101 sends, to the predetermined notification destination (such as the nurse call system 121), bed-leaving detection information indicating that the user 401 has left the bed 103. The bed-leaving detection information includes identification information for identifying at least one of the bed 103, the camera 102, a position at which the bed 103 is placed, and the user 401 who uses the bed 103.

Preferably, the bed-leaving detection information includes image data collected within a period of time (approximately 5 to 15 minutes, for example) before the user leaving the bed is detected.

Figure 4B:
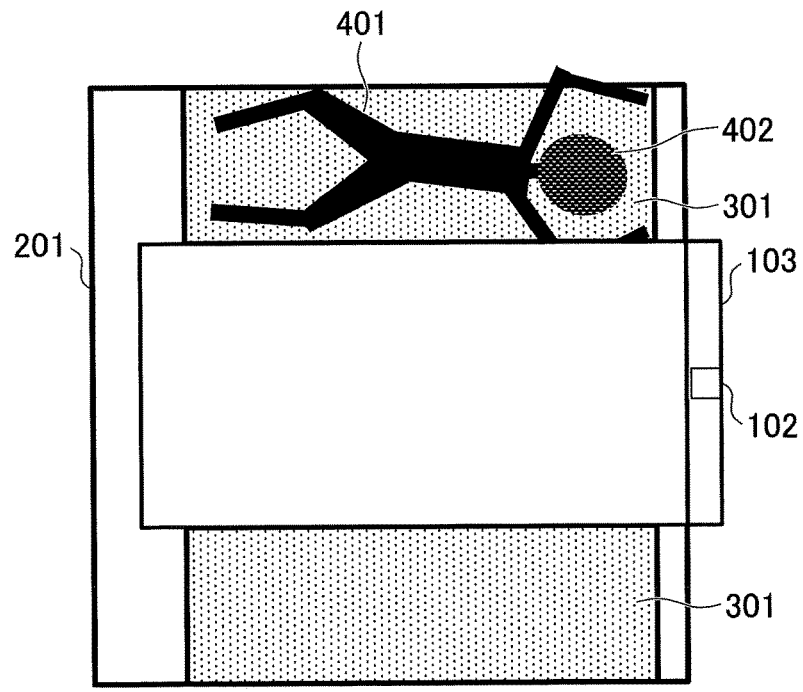

FIG. 4B illustrates an example of a fall detection pattern for detecting the user 401 who uses the bed 103 falling out of the bed 103. For example, when a temperature corresponding to the user 401's temperature previously detected on the bed 103 is detected in one of the fall detection areas 301 and remains in the detected one of the fall detection areas 301 beyond a predetermined period of time, the providing apparatus 101 determines (detects) that the user has fallen out of the bed.

Preferably, the information providing apparatus 101 detects a temperature corresponding to the user 401's temperature, more specifically, detects a temperature of a head 402 of the user 401 such that the position of the user 401 is detected. In the body of the user 401, the head 402 is less likely to be covered by clothes or a blanket, and further, the face is less likely to be affected by hair. Thus, it is preferable to detect the head 402.

For example, as illustrated in FIG. 4B, in image data acquired by the camera 102, the temperature of the head 402 of the user 401 is represented differently from that of other parts of the body (for example, the temperature of the head 402 is represented in a different color from that of the other parts). Therefore, by detecting an area corresponding to the size of the head 402 indicating a predetermined temperature (30° C. to 40° C., for example), namely by detecting a temperature corresponding to the user 401's temperature, the information providing apparatus 101 can detect a position of the user 401.

Preferably, the information providing apparatus 101 manages the detection range 201 by dividing the detection range 201 into the plurality of subareas as illustrated in FIG. 3B. When the number of the continuous subareas indicating the predetermined temperature (30° C. to 40° C., for example) is a predetermined number (five or more, for example), the information providing apparatus 101 detects the subareas as a temperature corresponding to the user 401's temperature.

As illustrated in FIG. 4B, when the information providing apparatus 101 detects the user 401 falling out of the bed 103, the information providing apparatus 101 sends, to the predetermined notification destination, fall detection information indicating that the user 401 has fallen out of the bed 103. The fall detection information includes the above-described identification information, and also includes image data collected within the predetermined period of time before the user falling out of the bed is detected.

As illustrated in FIG. 4B, the image data allows a position of the head 402 and a position of a torso of the user 401 to be estimated by using temperature distribution by color, although the user 401's face and facial expression are not identified. Accordingly, personnel such as nurses and caregivers can grasp the user 401's state (for example, the user falling out of the bed 103 or standing on the side of the bed 103) by checking screen data displayed on the display devices.

Preferably, the image data acquired by the camera 102 and sent by the information providing apparatus 101 to the predetermined notification destination includes image information that sufficiently represents an outline of the bed 103 and an outline of the user 401, in addition to colors indicating temperatures. Accordingly, the personnel such as nurses and caregivers can more accurately grasp the user 401's state by checking screen data displayed on the display devices.

Further, the image data acquired by the camera 102 and sent by the information providing apparatus 101 to the predetermined notification destination does not preferably include personally identifiable information such as a face and facial expressions. Accordingly, without handling personal information of the user 401, a service provider can provide the predetermined notification destination such as the nurse call system 121 with information of the user indicating the user's state by operating the information providing apparatus 101.

Figure 5A:
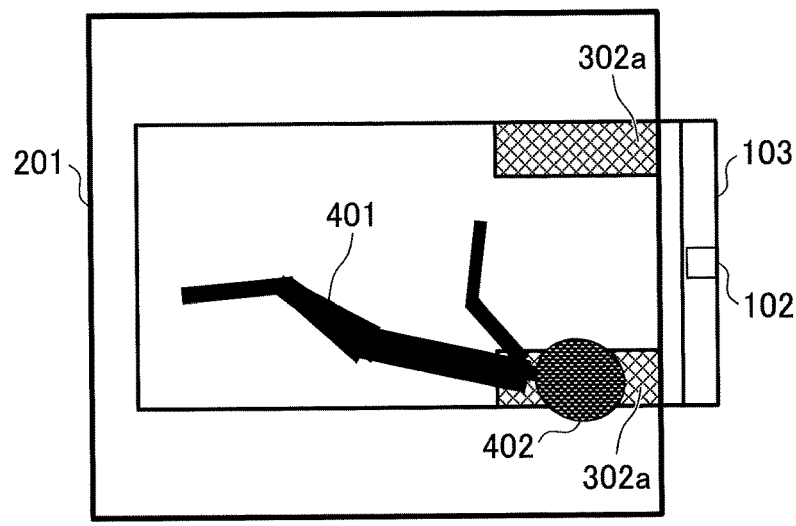
FIGS. 5A through 5C are diagrams illustrating examples of detection patterns according to an embodiment.
Figure 5B:
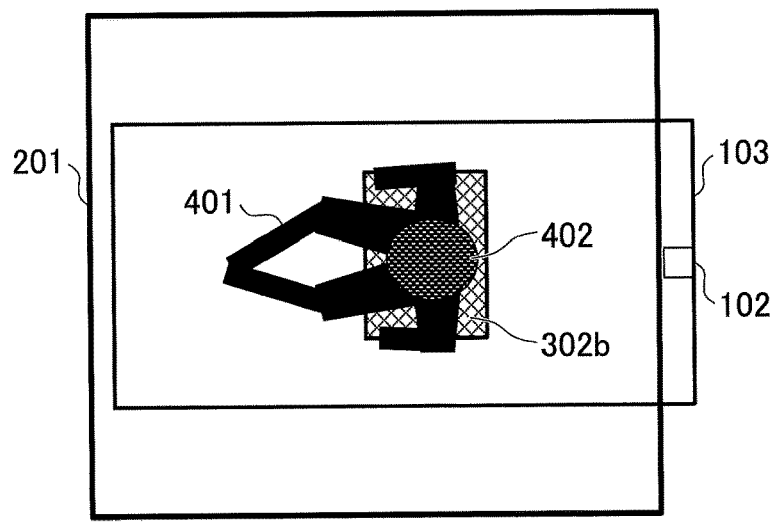
Figure 5C:
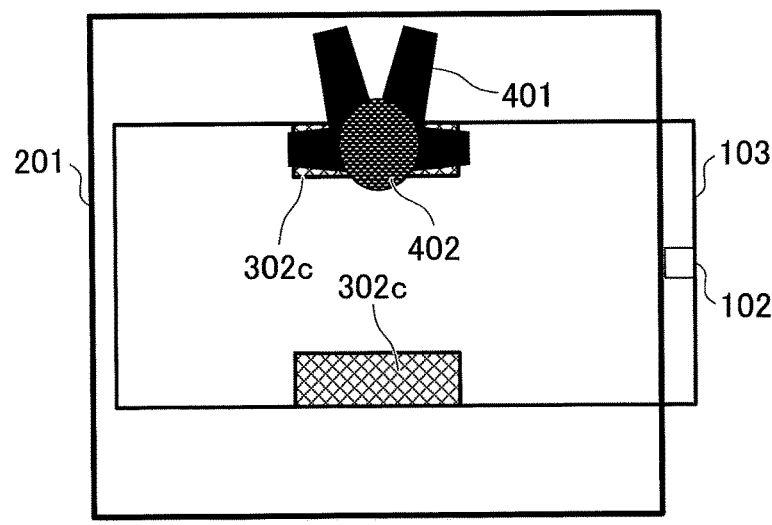

FIGS. 5A through 5C illustrate examples of detection patterns for detecting the user 401 as being in situations requiring attention (or in a hazardous situation). For example, as illustrated in FIG. 5A, when the temperature corresponding to the user 401's temperature (for example, the head 402 of the user 401) is detected in one of the caution areas A302a, the information providing apparatus 101 determines (detects) that the user 401 may be at risk of falling out of the bed 103.

Accordingly, in a case where the temperature corresponding to the user 401's temperature is detected in one of the caution areas A302a, the information providing apparatus 101 sends, to the predetermined notification destination, fall caution information indicating a risk of the user 401 falling out of the bed. The fall caution information includes the above-described identification information, and also includes image data collected within the predetermined period of time before the user falling out of the bed is detected.

Further, as illustrated in FIG. 5B, when the temperature corresponding to the user 401's temperature (for example, the head 402 of the user 401) is detected in the caution area B302b, the information providing apparatus 101 determines (detects) that the user has gotten up from the bed.

Accordingly, in a case where the temperature corresponding to the user 401's temperature is detected in the caution area B302b, the information providing apparatus 101 sends, to the predetermined notification destination, getting-up caution information indicating a risk of the user 401 falling out of the bed. The getting-up caution information includes the above-described identification information, and includes image data collected within the predetermined period of time before the user falling out of the bed is detected.

Further, as illustrated in FIG. 5C, when the temperature corresponding to the user 401's temperature is detected in one of the caution areas C302c, the information providing apparatus 101 determines (detects) that the user 401 is likely to leave the bed.

Accordingly, in a case where the temperature corresponding to the user 401's temperature is detected in one of the caution areas C302c, the information providing apparatus 101 sends, to the predetermined notification destination, leaving-bed caution information indicating a risk of the user 401 leaving the bed. The leaving-bed caution information includes the above-described identification information, and also includes image data collected within the predetermined period of time before the user falling out of the bed is detected.

The detection patterns illustrated in FIGS. 4A and 4B and FIGS. 5A through 5C are merely exemplary. When a change of a predetermined temperature in the one or more detection areas is detected as corresponding to a preset pattern, the information providing apparatus 101 may be configured to send information of the user 401 indicating the user 401's state to the predetermined notification destination.

As described, according to the embodiment, the information providing apparatus 101 can send, to the nurse call system 121, information of the user 401 indicating a state of the user 401 who uses the bed 103 placed in a facility such as a medical facility or a nursing facility. Therefore, it becomes possible for personnel such as nurses and caregivers in the facility to accurately grasp the state of the user 401 who uses the bed 103 placed in the facility.

<Hardware Configuration>

Figure 6:
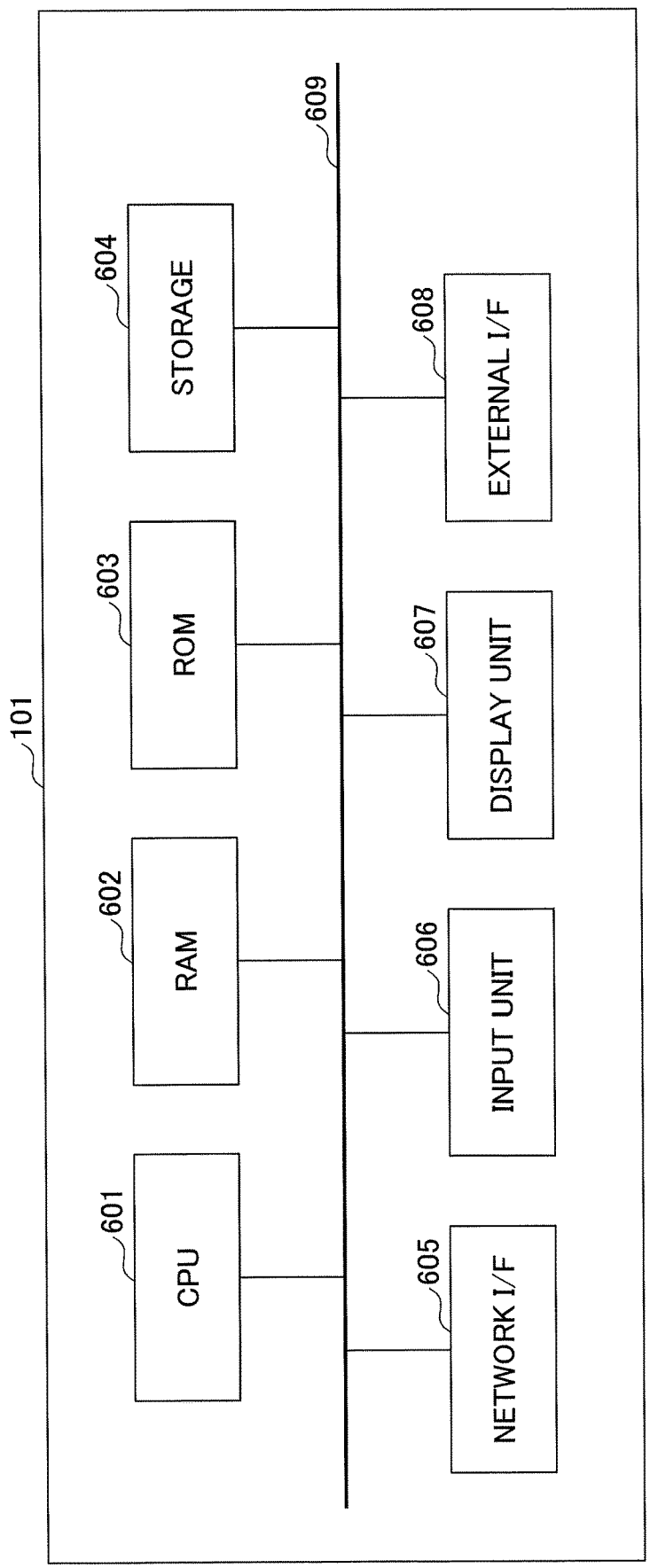
FIG. 6 is a diagram illustrating an example of a hardware configuration of the information providing apparatus according to an embodiment.

Next, a hardware configuration of the information providing apparatus 101 will be described. FIG. 6 is a diagram illustrating an example of the hardware configuration of the information providing apparatus according to an embodiment. The information providing apparatus 101 has a generally common computer configuration, and includes a central processing unit (CPU) 601, random-access memory (RAM) 602, read-only memory (ROM) 603, storage 604, network interface (I/F) 605, an input unit 606, a display unit 607, an external I/F 608, and a bus 609.

The CPU 601 is a processor configured to implement functions of the information providing apparatus 101 by causing programs and data stored in the ROM 603 and in the storage 604 to be loaded into the RAM 602 so as to execute processes. The RAM 602 is volatile memory used as a work area of the CPU 601. The ROM 603 is non-volatile memory that can retain programs and data even after the power is turned off.

The storage 604 is a large-capacity storage device such as a hard disk drive (HDD) and a solid-state drive (SSD), and stores an operating system (OS), application programs, and various types of data.

The network I/F 605 is a communication interface for coupling the information providing apparatus 101 to the network 104. The input unit 606 is an interface with an input device such as a pointing device (such as a mouse) and a keyboard. The input unit 606 is used to input operation signals into the information providing apparatus 101. The display unit 607 is a display device such as a display, or an interface for coupling to a display device. The display unit 607 is used display processing results performed by the information providing apparatus 101.

The external I/F 608 is an interface with an external device. The external device includes a recording medium, for example. By storing a predetermined program in the recording medium and installing the predetermined program into the information providing apparatus 101 via the external. I/F 608, the predetermined program can be executed by the information providing apparatus 101. The bus 609 is coupled to the above-described elements, and transmits address signals, data signals, and various types of control signals.

<Functional Configuration>

Figure 7A:
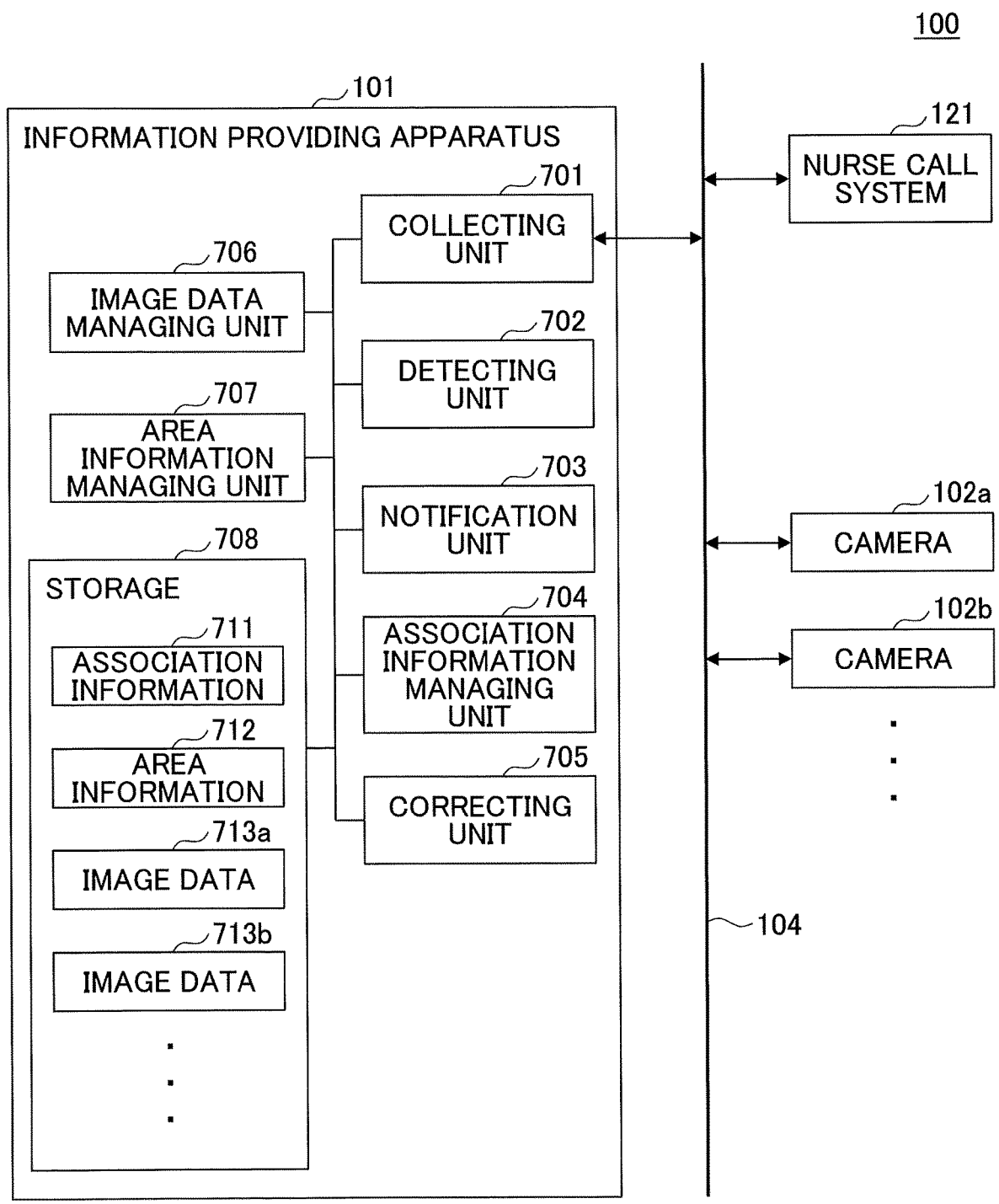
FIG. 7A is a diagram illustrating an example of a functional configuration of the information providing system according to an embodiment.

Next, a functional configuration of the information providing system 100 will be described. FIG. 7A is a diagram illustrating an example of the functional configuration of the information providing system 100 according to an embodiment. The information providing system 100 includes, for example, the information providing apparatus 101 coupled to the network 104 such as a local area network (LAN), and also includes the plurality of cameras 102a, 102b, etc. Further, the information providing apparatus 101 can communicate with the nurse call system 121, serving as an example of the predetermined notification destination, via the network 104, for example.

(Functional Configuration of Information Providing Apparatus)

The information providing apparatus 101 implements the collecting unit 701, a detecting unit 702, notification unit 703, an association information managing unit 704, a correcting unit 705, an image data managing unit 706, an area information managing unit 707, and storage 708 by causing the CPU 601 to execute predetermined programs.

The collecting unit 701 is implemented by a program executed by the CPU 601, for example. The collecting unit 701 collects image data transmitted from the camera 102 (acquisition device) via the network 104. The image data indicates temperatures on the corresponding bed 103 and around the corresponding bed 103 and is acquired by the camera 102. The collecting unit 701 sends the collected image data to the image data managing unit 706 and the detecting unit 702, for example.

The detecting unit 702 is implemented by a program executed by the CPU 601, for example. The detecting unit 702 detects a change of predetermined temperature in the one or more detection areas preset on the bed 103 and around the bed 103.

Preferably, in the plurality of divided subareas as illustrated in FIG. 3B, when the number of continuous subareas indicating the predetermined temperature (30° C. to 40° C., for example) is the predetermined number (five or more, for example), the detecting unit 702 detects the subareas as a temperature corresponding to the user 401's temperature.

The notification unit 703 is implemented by a program executed by the CPU 601, for example. When the change of the predetermined temperature in the one or more detection areas is detected as corresponding to a preset pattern, the notification unit 703 sends information of the user 401 indicating the user 401's state to the predetermined notification destination. For example, when a change of the predetermined temperature is detected as corresponding to one of the detection patterns illustrated in FIGS. 4A and 4B and FIGS. 5A through 5C, the notification unit 703 sends information of the user 401 to the nurse call system 121.

The association information managing unit 704 is implemented by a program executed by the CPU 601, for example. The association information managing unit 704 manages and stores, in the storage 708, association information 711 that associates changes of the predetermined temperature with corresponding notification descriptions of the changes of the predetermined temperature.

FIG. 8A illustrates an example of the association information 711 managed by the association information managing unit 704. In the example of FIG. 8A, the association information 711 includes items "detection pattern," "notification description," and "change of temperature".

The "detection pattern" includes names, numbers, or identification information for identifying detection patterns of changes of a predetermined temperature. The "notification description" includes information indicating each notification description of a change of the predetermined temperature. The "change of temperature" includes information detailing each change of the predetermined temperature.

In a detection pattern 1 of FIG. 8A, when the predetermined temperature (detection target) corresponding to that of the user 401 is moved to the outside of the detection range 201, information of the user 401 including the bed-leaving detection information indicating the user 401 having left the bed and also including image data is sent to a notification destination.

Preferably, the image data sent to the notification destination includes image data collected by the collecting unit 701 over the predetermined period of time before the change is detected.

Further, the detection patterns 1 to 5 illustrated in FIG. 8A correspond to the detection patterns explained in FIGS. 4A and 4B and FIG. 5A through 5C.

Further, as illustrated in a detection pattern 6, a pattern for sending information indicating the user 401 returning to the bed may be included.

Preferably, when a change of the predetermined temperature in the one or more detection areas is detected as corresponding to one of the detection patterns preset in the association information 711, the notification unit 703 sends, to the predetermined notification destination, information of the user including a notification description of the change of the predetermined temperature.

The correcting unit 705 is implemented by a program executed by the CPU 601, for example. When a position of the bed 103 is shifted from a predetermined position in the detection range 201, the correcting unit 705 moves a position of the detection range 201 in accordance with the shifted position of the bed 103.

The image data managing unit 706 is implemented by a program executed by the CPU 601, for example. The image data managing unit 706 stores image data collected by the collecting unit 701 in the storage 708, and manages the image data on a per-camera 102 basis. For example, the image data managing unit 706 stores image data acquired by the camera 102a in the storage 708 as image data 713a, and stores image data acquired by the camera 102b in the storage 708 as image data 713b.

Preferably, the image data managing unit 706 deletes, among the image data stored in the storage 708, image data that has passed a predetermined retention period (15 minutes, for example).

For image data in which a change of the predetermined temperature is detected, the image data is not deleted and is archived. The archived image data is stored with administrative rights, such that the archived image data is not deleted by non-administrators.

The area information managing unit 707 is implemented by a program executed by the CPU 601, for example. The area information managing unit 707 stores, in the storage 708, and manages area information 712 identifying the one or more detection areas preset in the detection range 201.

FIG. 8B illustrates an example of the area information 712. In the example of FIG. 8B, the area information 712 includes items "area," "attribute," and "coordinate range".

The "area" includes information indicating names, numbers, or identification information of the respective detection areas. The "attribute" includes information indicating types and attributes of the respective detection areas. The "coordinate range" includes coordinate information indicating ranges of the respective detection areas. For example, a range of a detection area having a rectangular shape is expressed as coordinates of four vertices.

In the area information 712 in the example of FIG. 8B, an area 1 (a detection area) is set as the detection range 201, an area 2 (an example of a first area) is set as the fall detection area 301, and an area 3 (an example of a second area) is set as the caution area A302a.

FIG. 8C illustrates another example of the area information 712. Area information 712 illustrated in FIG. 8C includes items "subarea," instead of including the coordinate ranges of the area information 712 illustrated in FIG. 8B. The "subarea" stores information indicating positions of the plurality of subareas included in each of the detection areas. The subareas are created by dividing the detection range 201 as illustrated in FIG. 3B.

The storage 708 is implemented by a program executed by the CPU 601, the storage 604, and the RAM 602, for example. The storage 708 stores the above-described association information 711, the area information 712, and the image data 713a, 713b, . . . etc.

Figure 7B:
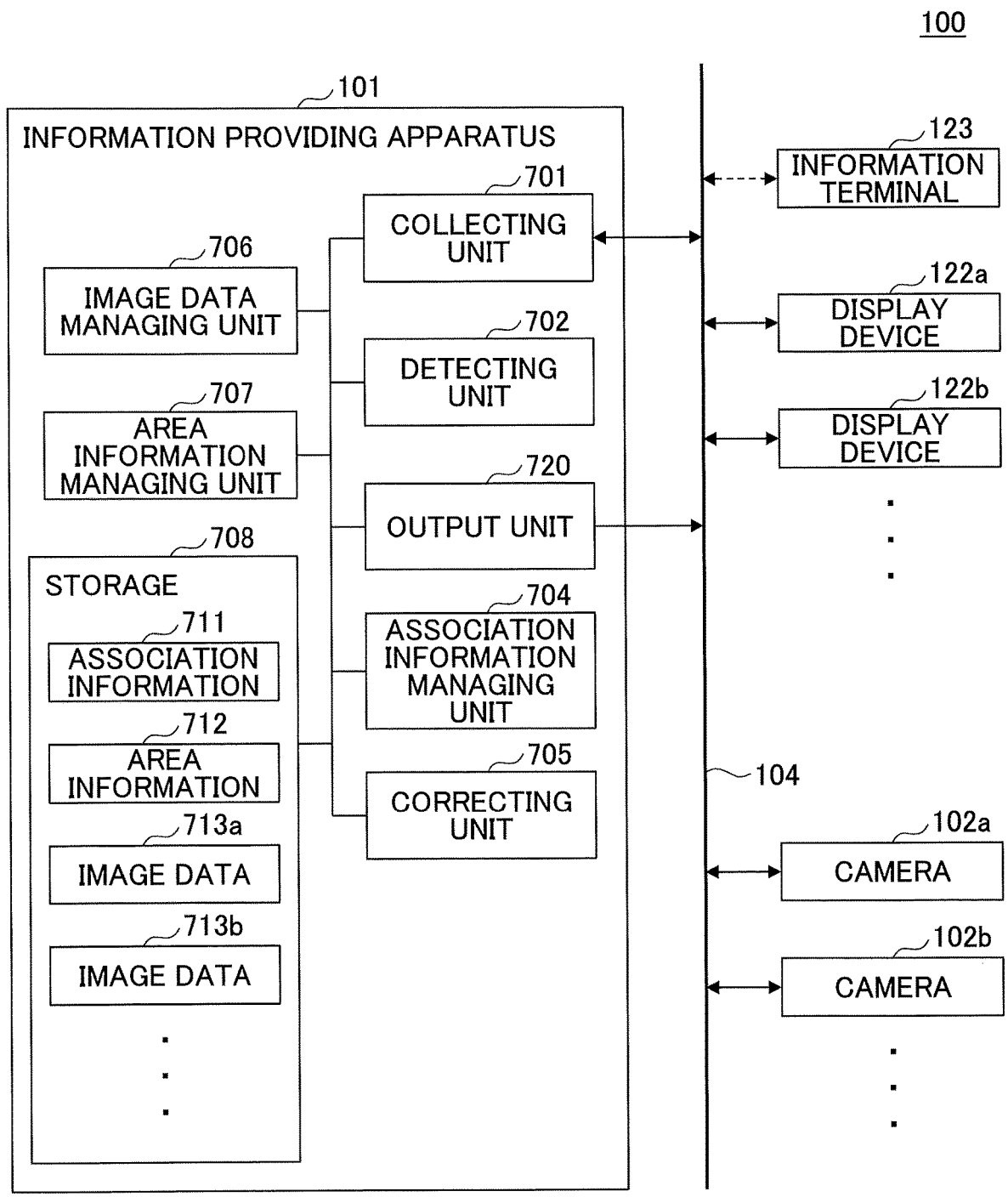
FIG. 7B is a diagram illustrating another example of a functional configuration of the information providing system according to an embodiment.

Further, as illustrated in FIG. 1B, when the information providing apparatus 101 and the nurse call system 121 are integrated, the information providing apparatus 101 may have a functional configuration as illustrated in FIG. 7B. A difference between FIG. 7B and FIG. 7A is that, instead of the notification unit 703, an output unit 720 is provided as an output interface to the display devices (the display devices such as 122a and 122b, and the one or more information terminals 123, for example). The output unit 720 is implemented by, for example, program executed by the CPU 601 illustrated in FIG. and the display unit 607.

In the embodiments, the nurse call system 121 is an example of the predetermined notification destination. The nurse call system 121 may have any configuration as long as the nurse call system 121 is configured to at least output received information to one or more predetermined display devices, and thus a detailed description thereof will be omitted. Further, in the embodiments, as the camera 102, a generally common thermography camera can be adopted, and thus a detailed description thereof will be omitted.

<Process Flow>

Next, a process flow of an information providing method will be described.

First Embodiment (Process of Information Providing Apparatus)

Figure 9:
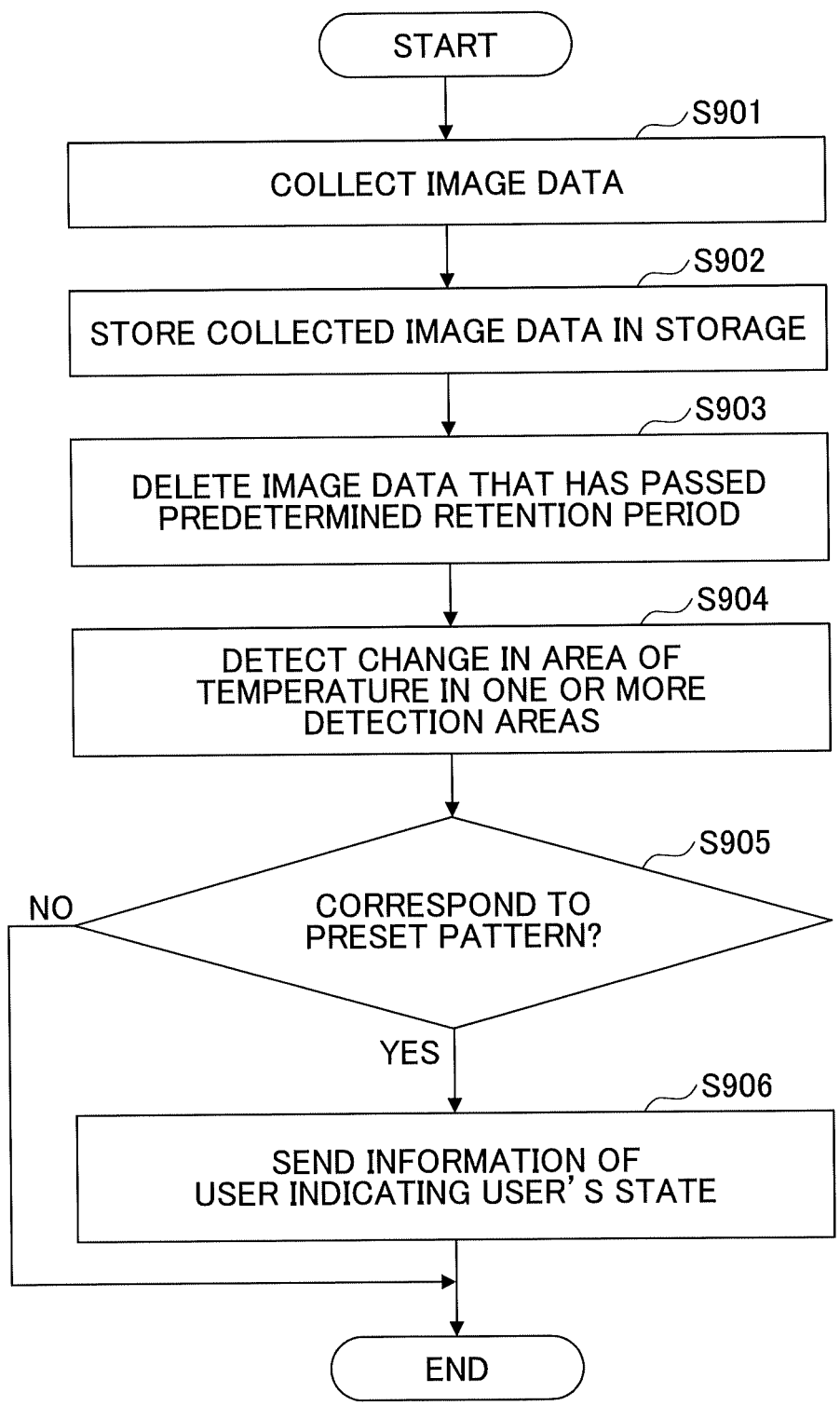
FIG. 9 is a flowchart illustrating an example of a process performed by the information providing apparatus according to a first embodiment.

FIG. 9 is a flowchart illustrating an example of a process performed by the information providing apparatus according to a first embodiment. The information providing apparatus 101 performs a process as illustrated in FIG. 9, in response to receiving image data transmitted from each of the one or more cameras 102a, 102b, etc.

In step S901, upon the collecting unit 701 collecting image data transmitted from the camera 102, the information providing apparatus 101 performs the process as of step S902. In the example of the process described below, it is assumed that the collecting unit 701 collects the image data transmitted from the camera 102a.

In step S902, the image data managing unit 70 stores the image data, transmitted from the camera 102a and collected by the collecting unit 701, in the storage 708 as the image data 713a. For example, based on identification information included in the image data collected by the collecting unit 701, the image data managing unit 706 stores the image data transmitted from the camera 102a in a folder associated with the camera 102a.

In step S903, the image data managing unit 706 deletes, among the image data 713a stored in the storage 708, image data that has passed a predetermined retention period (15 minutes, for example). In this step, as unnecessary image data is deleted, the storage capacity of the storage 708 can be retained and also processing loads of the following steps can be reduced.

In step S904, the detecting unit 702 detects a change of a predetermined temperature in one or more detection areas, based on the image data 713a collected by the collecting unit 701 and stored in the storage 708 by the image data managing unit 706. For example, the detecting unit 702 detects a path of movement of an area indicating the predetermined temperature corresponding to temperature of the head 402 of the user 401.

In step S905, the notification unit 703 determines whether the change of the predetermined temperature in the one or more detection areas corresponds to a preset pattern. For example, the notification unit 703 determines whether the change of the predetermined temperature corresponds to one of the detection patterns included in the association information 711, as illustrated in FIG. 8A.

When the change of the predetermined temperature does not correspond to any of the detection patterns, the notification unit 703 ends the process. Conversely, when the change of the predetermined temperature corresponds to one of the detection patterns, the notification unit 703 causes the process to proceed to step S906.

In step S906, the notification unit 703 sends, to a predetermined notification destination (for example, the nurse call system 121), information of the user 401 indicating a state of the user 401 who uses the bed 103a corresponding to the camera 102a. The information of the user 401 includes information for identifying at least one of the bed 103a corresponding to the camera 102a, a position at which the bed 103a is placed, and the user 401 of the bed 103a (identification information).

Further, the information of the user 401 includes a notification description of the detected change of the predetermined temperature as illustrated in the association information 711 of FIG. 8A. For example, in a case where a change of a predetermined temperature is detected as corresponding to the "pattern 1" of the association information 711 illustrated in FIG. 8A, information of the user 401 includes bed-leaving detection information indicating the user 401 leaving the bed and also includes image data collected within a predetermined period of time before the change is detected.

According to the above-described process, when a change of a predetermined temperature in one or more detection areas is detected, the information providing apparatus 101 can send information of a user indicating the user's state to a predetermined notification destination such as the nurse call system 121 based on image data acquired from the corresponding camera 102.

(Process of Information Providing System)

Figure 10:
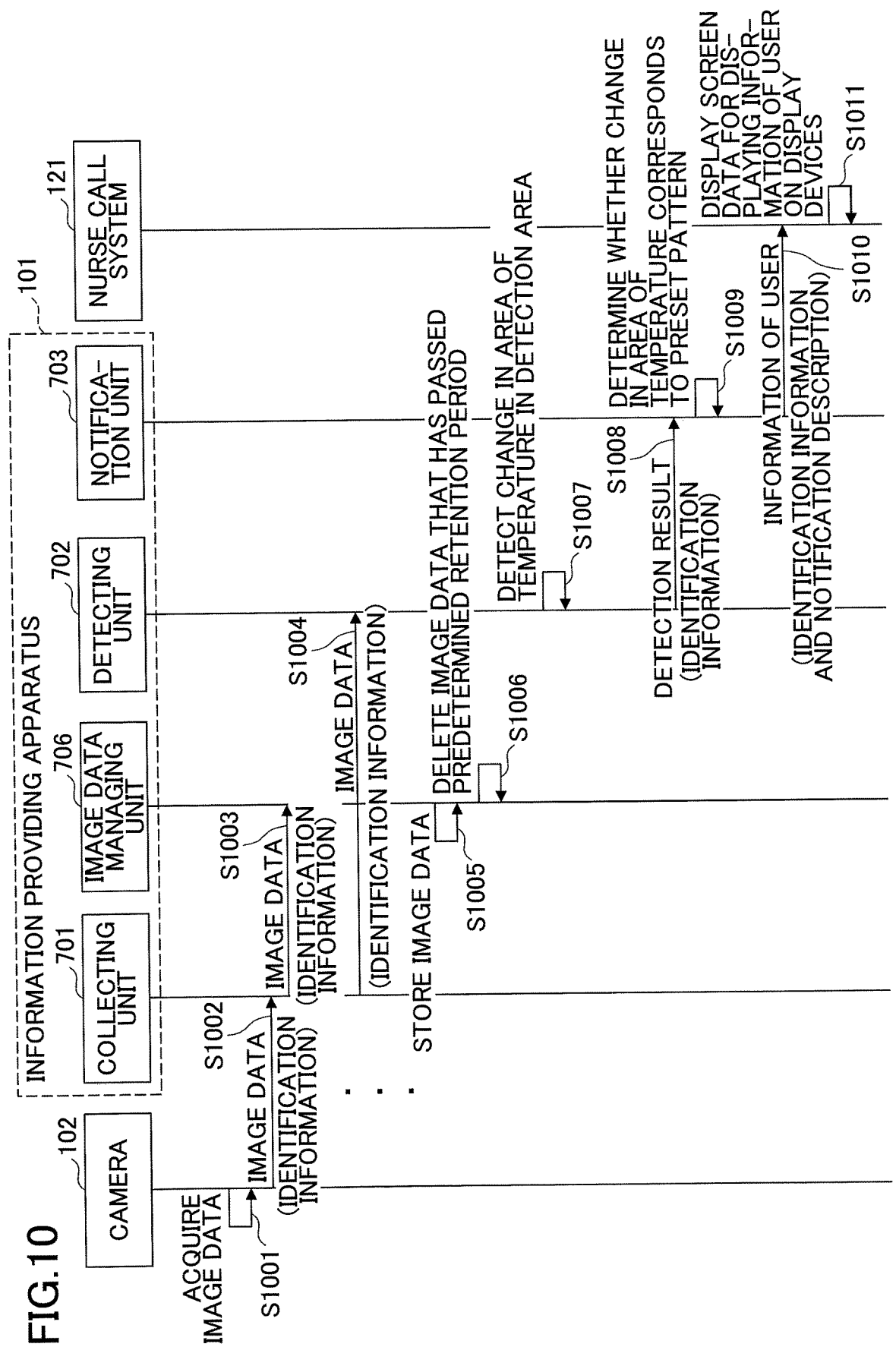
FIG. 10 is a sequence diagram illustrating an example of a process performed by the information providing system according to the first embodiment.

FIG. 10 is a sequence diagram illustrating an example of a process performed by the information providing system according to the first embodiment. This process is an example of the entire process performed by the information providing system 100.

In step S1001, the camera 102 acquires image data indicating temperatures on the corresponding bed 103 and around the corresponding bed 103.

In step S1002, the camera 102 transmits the acquired image data to the information providing apparatus. The image data includes identification information for identifying the camera 102, the bed 103 corresponding to the camera 102, a position at which the bed 103 is placed, and the user 401 of the bed 103. The camera 102 repeatedly performs steps S1001 and S1002 at predetermined time intervals (at intervals of 10 seconds to 60 seconds, for example).

In steps S1003 and S1004, the collecting unit 701 of the information providing apparatus 101 sends the image data collected from the camera 102 to the image data managing unit 706 and the detecting unit 702.

In step S1005, the image data managing unit 706 of the information providing apparatus 101 stores the image data in a folder associated with the camera 102, based on identification information included in the image data sent from the collecting unit 701.

In step S1006, the image data managing unit 706 deletes, among the image data stored in the folder associated with the camera 102, image data that has passed a predetermined retention period (5 minutes to 15 minutes, for example).

In step S1007, the detecting unit 702 of the information providing apparatus 101 detects a change of a predetermined temperature in one or more detection areas, based on the image data collected by the collecting unit 701. For example, based on at least one image data collected by the collecting unit 701 and stored in the storage 708, the detecting unit 702 detects location transition of a predetermined temperature corresponding to the user 401's temperature in one or more detection areas, or detects existence of the predetermined temperature corresponding to the temperature of the user 401 in a predetermined detection area.

In step S1008, the detecting unit 702 sends, to the notification unit 703, a detection result of the change of the predetermined temperature in one or more detection areas. The detection result includes, for example, the above-described identification information.

In step S1009, the information providing apparatus 101 determines whether the change of the predetermined temperature detected by the detecting unit 702 corresponds to a preset pattern of a change of the predetermined temperature. For example, the notification unit 703 determines whether the change of the predetermined temperature corresponds to one of the detection patterns included in the association information 711 as illustrated in FIG. 8A.

The notification unit 703 performs step S1010 when the change of the predetermined temperature detected by the detecting unit 702 corresponds to one of the preset patterns.

In step S1010, the notification unit 703 sends, to the nurse call system 121, information of the user including a notification description of the change of the predetermined temperature included in the association information 711 as illustrated, in FIG. and also including identification information included in the detection result. As can be seen from the "notification description" of the association information 711 in FIG. 8A, the information of the user includes information indicating the user's state and also includes image data collected within a predetermined period of time before the preset pattern of the change of the predetermined temperature is detected.

In step S1011, the nurse call system 121 causes the display devices 122a through 122c and the one or more information terminals 123 to display screen data for displaying the information of the user sent from the information providing apparatus 101.

According to the above-described process, in a case where the user 401 who uses the bed 103a has fallen out of the bed 103a placed in the inpatient ward 110 of FIG. 1A, a display screen indicating the user 401 having fallen out of the bed 103a is displayed on the display device 122a installed in the nurse station A. At this time, the nurse call system 121 can also display, on the display screen, image data collected within a predetermined period of time before the fall of the user 401 is detected. Accordingly, personnel such as nurses and caregivers can more accurately grasp state of the user 401 who uses the bed 103a by checking the display screen.

According to the information providing system 100 of the present embodiment, it becomes possible to accurately grasp states of users who use beds placed in a facility such as a medical facility or a nursing facility.

Second Embodiment

In a second embodiment, an exemplary process for reducing false detection when detecting a user's state will be described.

Figure 11:
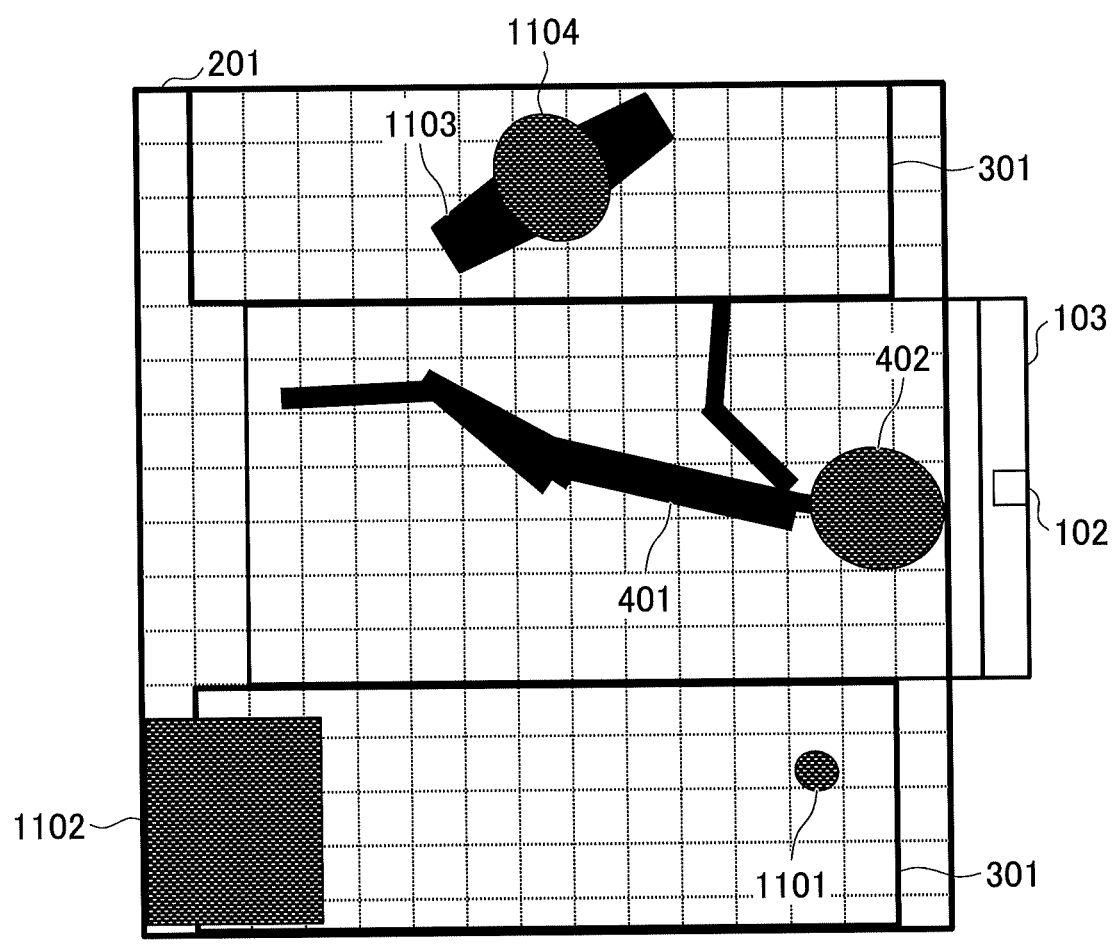
FIG. 11 is a diagram illustrating an example of a detection process according to a second embodiment.

FIG. 11 is a diagram illustrating an example of a detection process according to the second embodiment. In FIG. 11, a small object 1101, such as a mobile phone, a smartphone, a disposable heating pad, or a charger having a temperature close to human body temperature, is assumed to exist in a detection range 201. In this case, it is desirable for the detecting unit 702 of the information providing apparatus 101 to exclude the object 1101 from a target of the detection process.

For example, the detecting unit 702 excludes, among areas falling within a predetermined temperature range (from 30° C. to 40° C., for example), an area whose size is less than a size of a head of a person's body (for example, an area whose number of subareas is less than or equal to 4) from a target of the detection process. In this way, the detecting unit 702 can exclude the object 1101 from a target of the detection process.

Further, in FIG. 11, an object 1102 larger than the object 1101, such as a television, a refrigerator, or a personal computer having a temperature close to human body temperature, is assumed to be placed in the detection range 201. In this case, it is desirable for the detecting unit 702 of the information providing apparatus 101 to exclude the object 1102 from a target of the detection process.

For example, the detecting unit 702 excludes, among areas falling within the predetermined temperature range, an area that is not moved for a predetermined period of time from a target of the detection process. In this way, the detecting unit 702 can also exclude the object 1102 from a target of the detection process.

Further, in FIG. 11, a person 1103 other than the user 401 of the bed 103, such as a medical professional (for example, a nurse or a doctor), a family member visiting the user 401, or a caregiver, is assumed to exist in the detection range 201. In this case, it is desirable for the information providing apparatus 101 not to send a detection result so as to prevent a head 1104 of the person 1103 from being mistakenly detected.

For example, when two or more areas other than the objects 1101 and 1102 exist, the detecting unit 702 stops sending a detection result. As the person 1103 is beside the user 401 of the bed 103, it is assumed that, even if the user 401 is in a hazardous situation, the situation can be promptly and properly handled.

<Process Flow>

Figure 12:
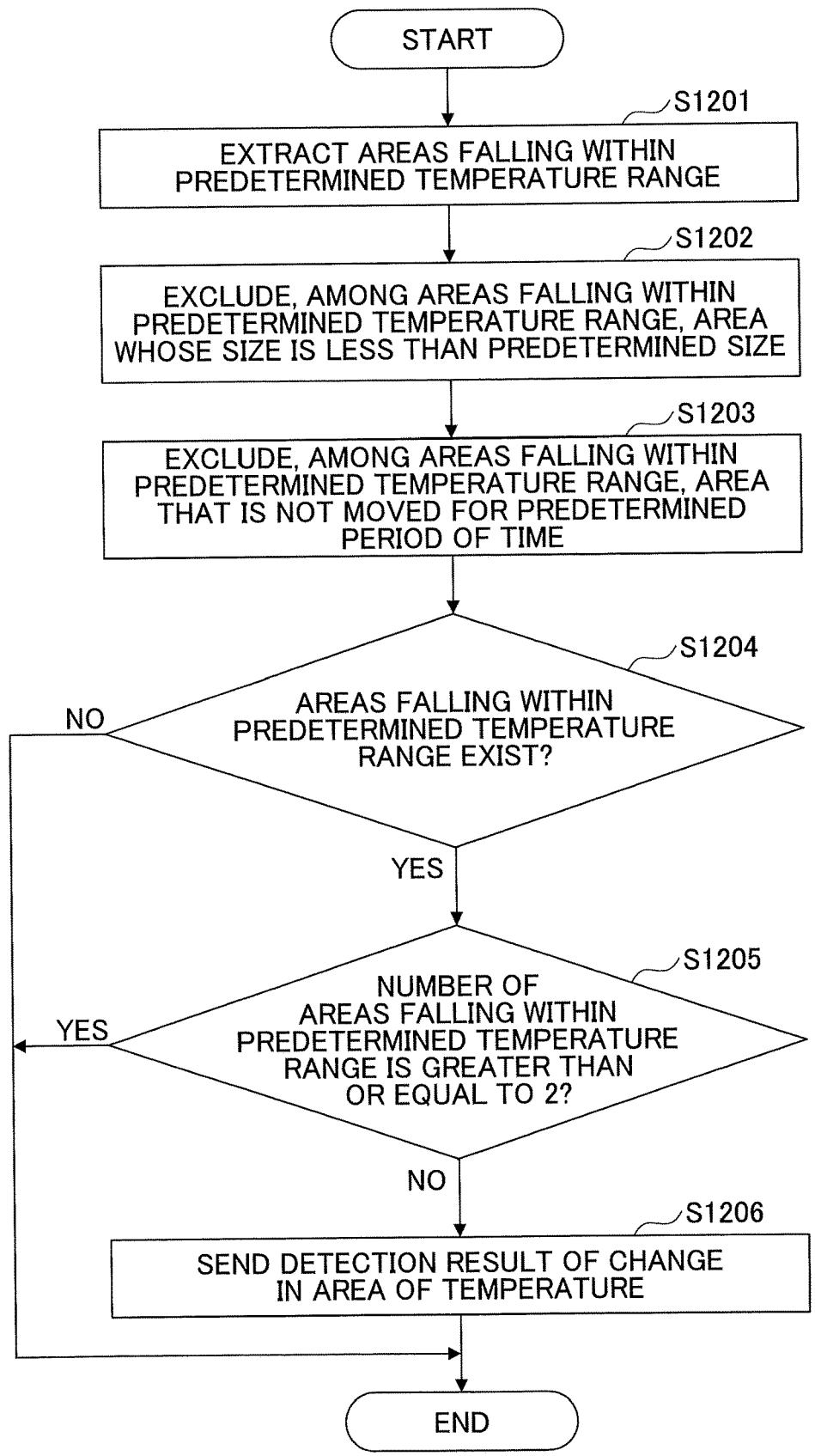
FIG. 12 is a flowchart illustrating an example of the detection process according to the second embodiment.

FIG. 12 is a flowchart illustrating an example of the detection process according to the second embodiment. This process is an example of the detection step (step S904) performed by the detecting unit 702 of the information providing apparatus 101.

In step S1201, the detecting unit 702 extracts areas falling within a predetermined temperature range in the detection range 201. In the example of FIG. 11, the head 402 of the user 401 on the bed 103, the head 1104 of the person 1103, and objects 1101 and 1102 are detected, for example.

In step S1202, the detecting unit 702 excludes, among the detected areas falling within the predetermined temperature range, an area whose size is less than a predetermined size (for example, an area whose number of subareas is less than or equal to 4) from a target of the detection process. In this way, in the example of FIG. 11, the object 1101 is excluded from a target of the detection process.

In step S1203, the detecting unit 702 excludes, among the detected areas falling within the predetermined temperature range, an area that is not moved for a predetermined period of time from a target of the detection process. In this way, in the example of FIG. 11, the object 1102 is excluded from a target of the detection process.

In step S1204, the detecting unit 702 determines whether one or more areas falling within the predetermined temperature range and are not excluded from the detection process exist in the detection range 201.

When one or more areas within the predetermined temperature range and not excluded from the detection process do not exist in the detection range 201, the detecting unit 702 ends the detection process. Conversely, when one or more areas within the predetermined temperature range and not excluded from the detection process exist in the detection range 201, the detecting unit 702 causes the process to proceed to step S1205.

In step S1205, the detecting unit 702 determines whether the number of the areas falling within the predetermined temperature range and not excluded from the detection process is greater than or equal to 2.

When the number of the areas within the predetermined temperature range and not excluded from the detection process is greater than or equal to 2, the detecting unit 702 ends the process without sending a detection result. Conversely, when the number of the areas within the predetermined temperature range and not excluded from the detection process is less than 2, namely when the number of the areas within the predetermined temperature range and not excluded from the detection process is 1, the detecting unit 702 causes the process to proceed to S1206.

In step S1206, the detecting unit 702 sends a detection result of a change of a predetermined temperature to the notification unit 703, for example.

According to the above-described process, in steps S1007 and S1008 of FIG. 10, for example, it is possible to prevent detection results of an object and a person other than the user 401, such as the object 1101, the object 1102, and the person 1103 illustrated in FIG. 11, from being sent to the notification unit 703. According to the present embodiment, the information providing apparatus 101 can reduce false detection when detecting a user's state.

Third Embodiment

A third embodiment describes an example of a preferable process performed when a state of the user 401 leaving the bed, which corresponds to the detection pattern 1 of FIG. 8A, is detected.

For example, when the state of the user 401 having left the bed (which corresponds to the detection pattern 1 of FIG. 8A) is determined, the user 401 is expected to return to the bed 103 after a while. However, even if a change of a predetermined temperature is detected in the detection range 201, it is difficult to determine whether the user 401 has returned or a person other than the user 401 such as a visitor and medical personnel has visited.

Therefore, in the present embodiment, after the state of the user 401 leaving the bed is detected, a detection result is not sent even if a change of predetermined temperature is detected in the detection range 201. In this case, sending a detection result is resumed when a detection target is detected as remaining on the bed 103 for at least a predetermined period of time. This is because a person other than the user 401 such as a visitor or medical personnel is unlikely to remain on the bed 103 for at least the predetermined period of time. Thus, it is determined the user 401 has returned to the bed 103.

<Process Flow>

Figure 13:
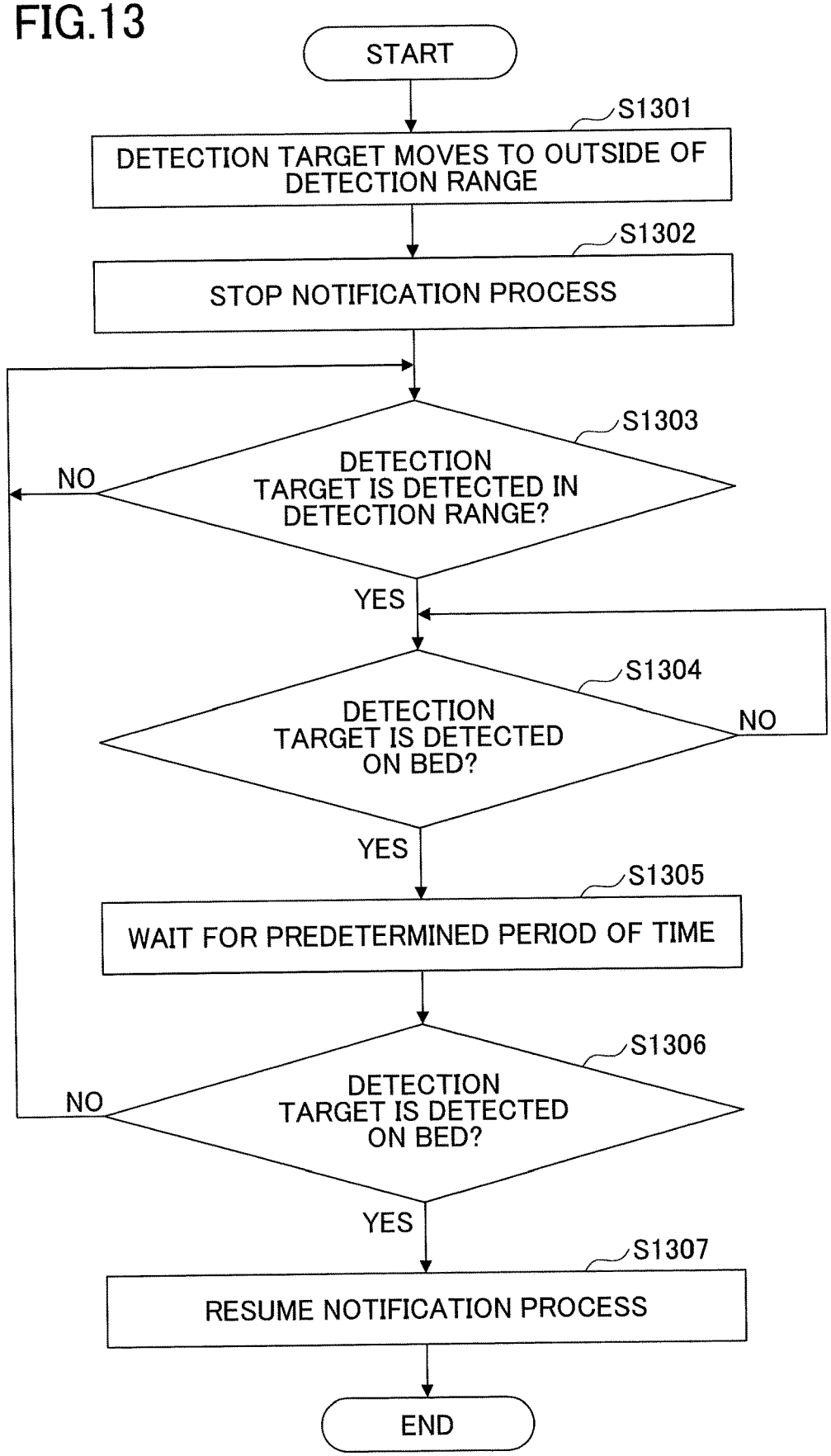
FIG. 13 is a flowchart illustrating an example of a detection process according to a third embodiment.

FIG. 13 is a flowchart illustrating an example of a detection process according to a third embodiment. This process is performed by the information providing apparatus 101 when a state of the user 401 leaving the bed, which corresponds to the detection pattern 1 of FIG. 8A, is detected.

In step S1301, when a detection target moves to the outside of the detection range 201, the information providing apparatus 101 performs the process as of step S1302.

In step S1302, the notification unit 703 of the information providing apparatus 101 stops a notification process.

Figure 14A:
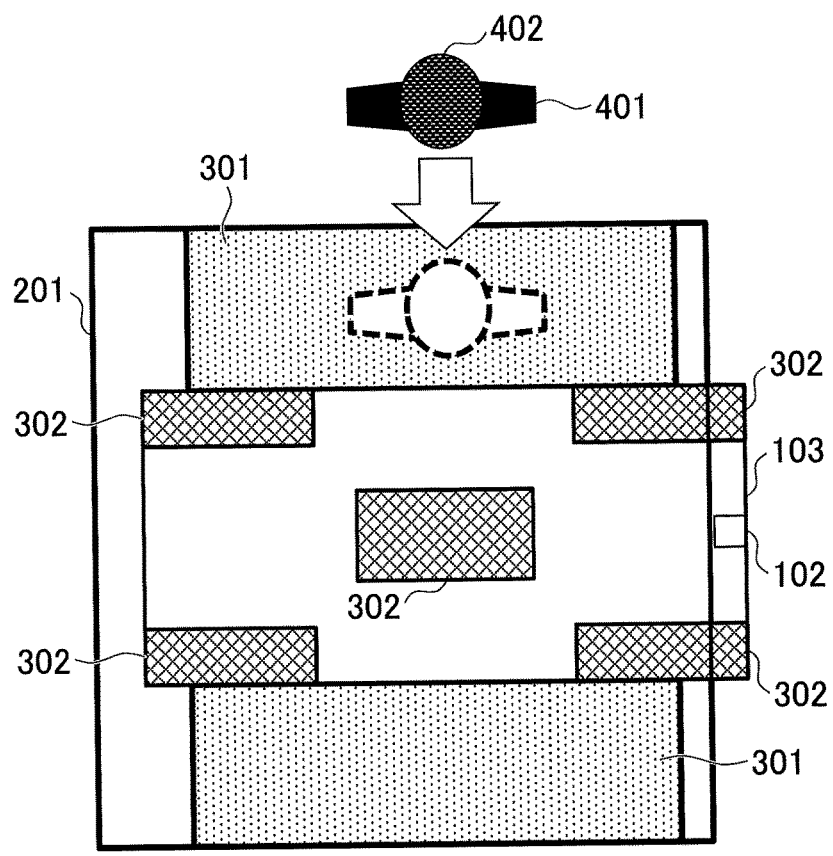
FIGS. 14A and 14B are diagrams for explaining the detection process according to the third embodiment.

In step S1303, the detecting unit 702 of the information providing apparatus 101 determines whether the detection target is detected in the detection range 201. When the detection target is detected in the detection range 201, the detecting unit 702 causes the process to proceed to step S1304. For example, as illustrated in FIG. 14A, when the user of the bed 103 returns to the detection range 201 from the outside of the detection range 201, the process as of S1304 is performed.

Figure 14B:
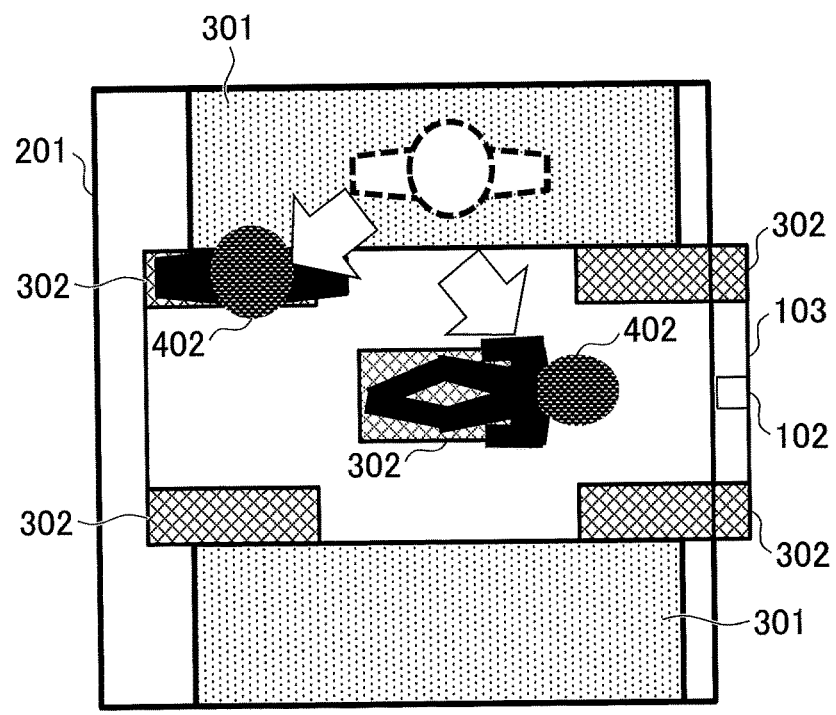

In step S1304, the detecting unit 702 determines whether the detection target is detected on the bed 103. When the detection target is detected on the bed 103, the detecting unit 702 causes the process to proceed to step S1305. For example, as illustrated in FIG. 14B, when the user of the bed 103 returns to the bed 103, the process as of S1305 is performed.

In step S1305, after the detecting unit 702 waits for a predetermined period of time (for approximately several tens of seconds to several minutes, for example), the detecting unit 702 causes the process to proceed to step S1306.

In step S1306, the detecting unit 702 determines again whether the detection target is detected on the bed 103.

When the detection target is not detected on the bed 103, the detecting unit 702 of the information providing apparatus 101 causes the process to return to step S1303 and repeats the process. Conversely, when the detection target is detected on the bed 103, the detecting unit 702 causes the process to proceed to step S1307.

In step S1307, the notification unit 703 of the information providing apparatus 101 resumes the notification process. In this way, when the information providing apparatus 101 detects a change of a predetermined temperature in one or more detection areas, the information providing apparatus 101 resumes the notification process for sending information of the user 401 indicating the user 401's state to a predetermined notification destination such as the nurse call system 121 as illustrated in FIG. 9.

According to the above-described process, the information providing apparatus 101 can properly determine whether the user 401 has returned to the bed 103, and can resume the information providing processes as illustrated in FIG. 9 and FIG. 10. Further, according to the above-described process, when a person other than the user 401 such as a visitor or medical personnel visits the user 401, it is possible to effectively prevent a notification indicating the user 401 having returned to the bed from being mistakenly sent to the notification destination such as the nurse call system 121.

Fourth Embodiment

In a fourth embodiment, an example of a correction process performed by the information providing apparatus 101 when a position of the bed 103 is shifted from a predetermined position will be explained.

In a case where the camera 102 is installed on the wall or the ceiling of a patient room, accuracy of the detection process performed by the detecting unit 702 may decrease when the position of the bed 103 is shifted from a predetermined position. Therefore, the information providing apparatus 101 includes the correcting unit 705 configured to correct, when the position of the bed 103 is shifted, a position of the detection range 201 in accordance with the position of the bed 103.

Figure 15:
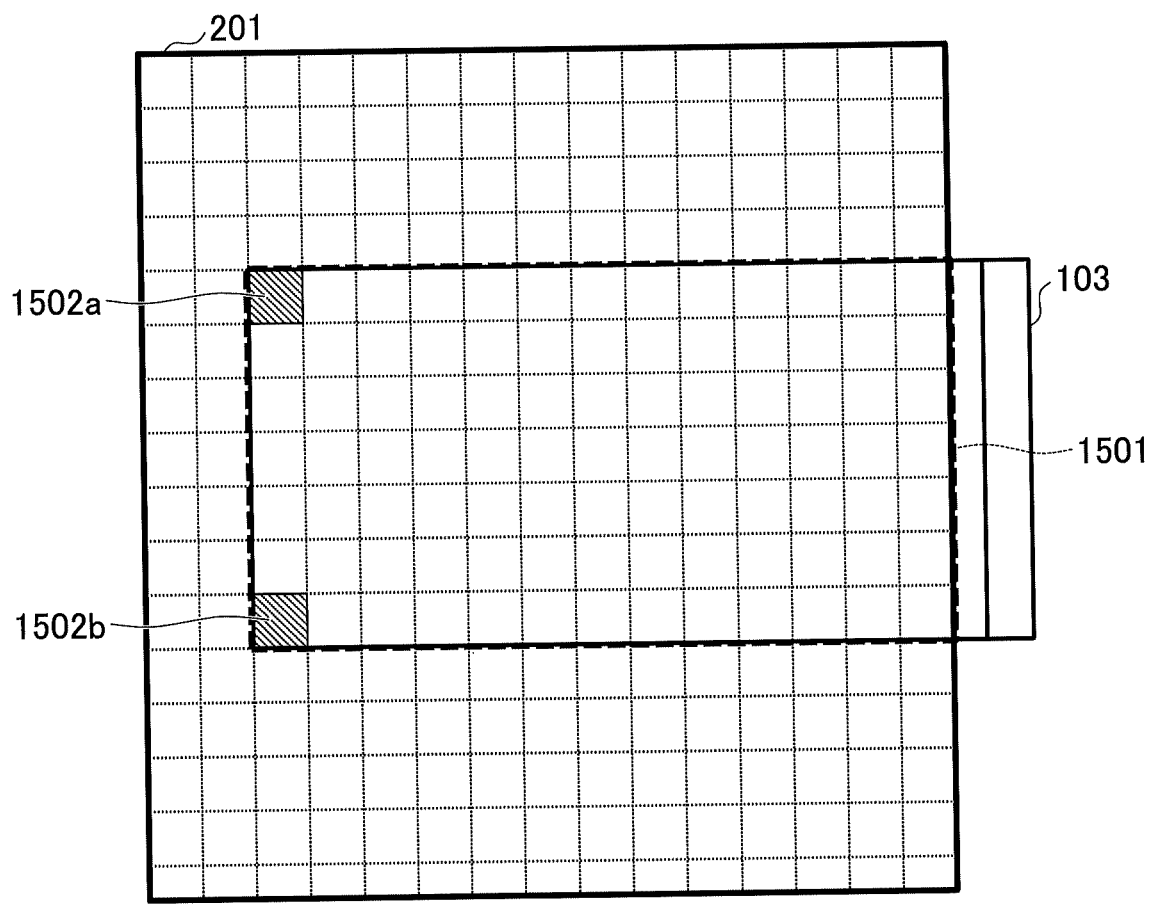
FIG. 15 is a diagram for explaining a correction process according to a fourth embodiment.

FIG. 15 is a diagram for explaining the correction process according to the fourth embodiment. As an example, image data acquired by the camera 102 includes image information that sufficiently represents an outline of the bed 103 and an outline of the user 401, in addition to colors indicating temperatures on the bed 103 and temperatures around the bed 103. In this case, the correcting unit 705 preliminarily stores an area 1501 corresponding to the position of the bed 103 in the detection range 201.

Figure 16A:
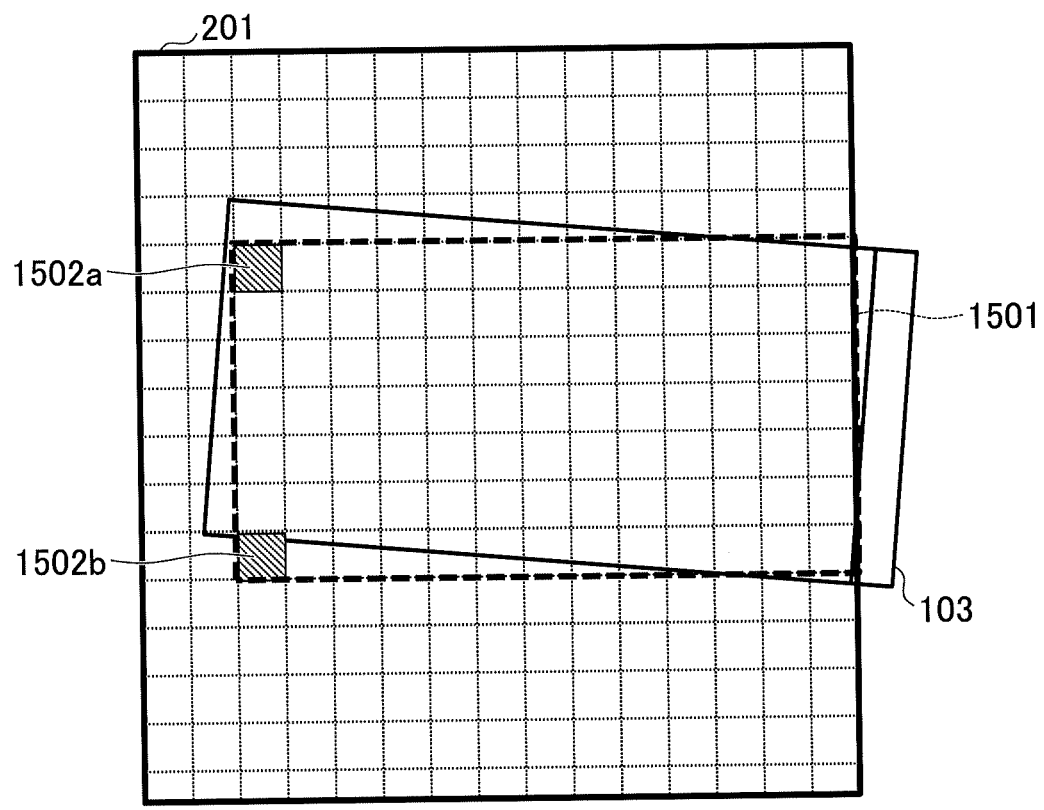
FIGS. 16A and 16B are diagrams for explaining the correction process according to the fourth embodiment.
Figure 16B:
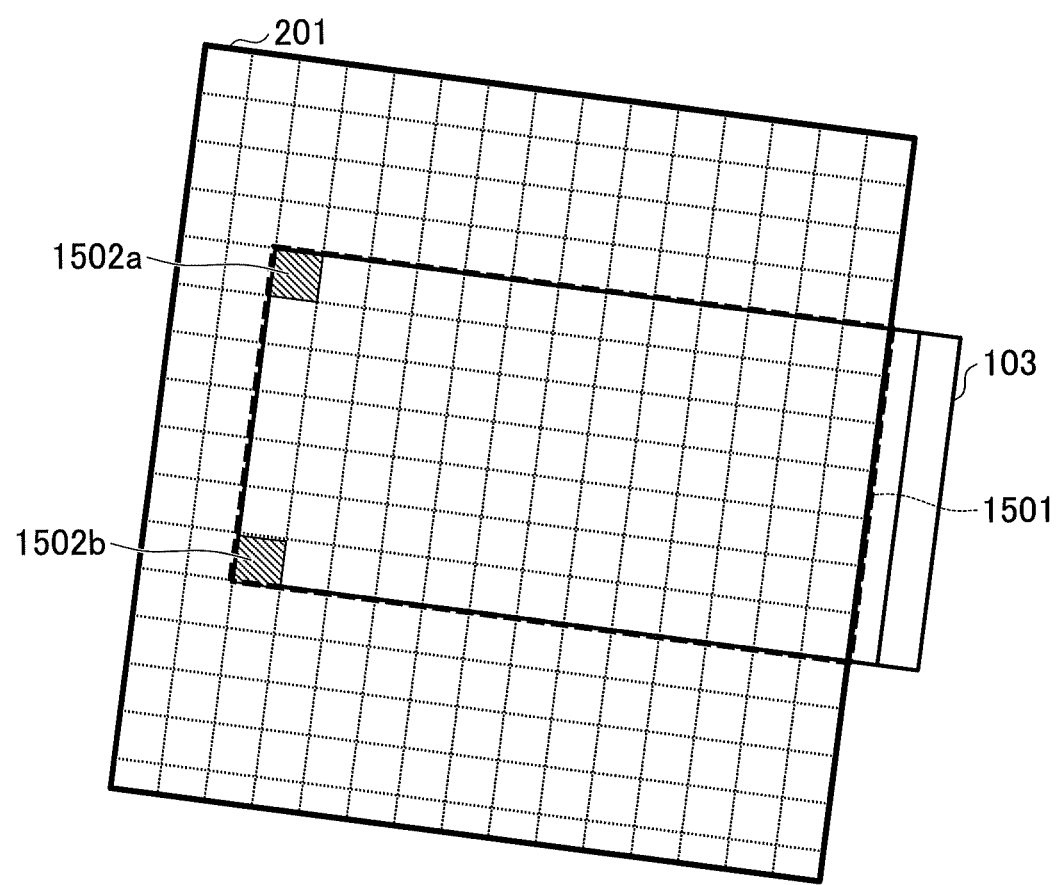

Further, when the correcting unit 705 determines that, based on the image data acquired by the camera 102, the position of the bed 103 is shifted as illustrated in FIG. 16A, the correcting unit 705 moves the detection range 201 in accordance with the position of the bed 103 as illustrated in FIG. 16B. For example, the correcting unit 70 applies image processing to the detection range 201, including moving, rotating, enlarging, and reducing the detection range 201, such that the preliminarily stored area 1501 corresponding to the position of the bed 103 matches the outline of the bed 103.

As another example, the correcting unit 705 preliminarily stores subareas 1502a and 1502b corresponding to two respective corners of the bed 103 as illustrated in FIG. 15. Further, objects having a predetermined temperature are preliminarily attached to the two respective corners of the bed 103.

when the correcting unit 705 determines that, based on the image data acquired by the camera 102, the position of the bed 103 is shifted as illustrated in FIG. 16A, the correcting unit 705 applies image processing to the detection range 201, including moving, rotating, enlarging, and reducing the detection range 201, such that temperatures of the preliminarily stored subareas 1502a and 1502b each conform to the predetermined temperature.

According to the above-described process, it is possible to perform the processes according to the first and second embodiments without changing information of subareas included in each detection area. Further, according to the above-described process, it becomes also possible to suppress a decrease in accuracy of the detection process performed by the detecting unit 702.

For example, in addition to when the position of the bed is changed as described above, when the height of the bed is changed, the above-described process may also be performed by applying image processing to the detection range 201, including moving, rotating, enlarging, and reducing the detection range 201.

Fifth Embodiment

The first through fourth embodiments have described the examples in which the information providing apparatus 101 sends, to the nurse call system 121, information of the user 401 indicating the "current state" of the user 401 who uses the bed 103 placed in a facility such as a medical facility or a nursing facility.

In a fifth embodiment, an example will be described in which the information providing apparatus 101 converts a state of the user 401 who uses the bed 103 into numerical values, stores the numerical values, and provides an analysis result in which a "previous state" of the user 401 of the bed 103 is visualized.

<System Configuration>

Figure 17:
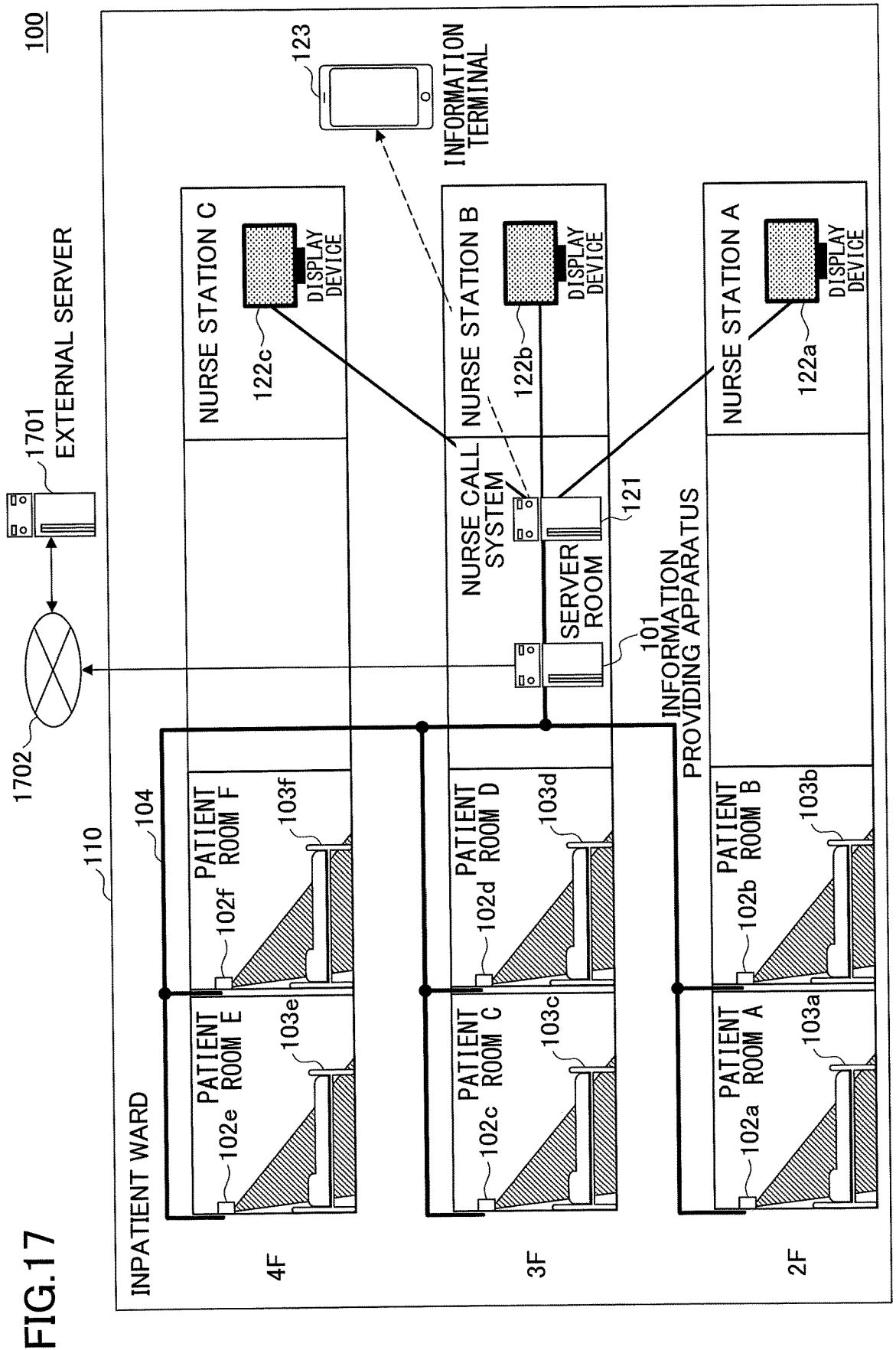
FIG. 17 is a diagram illustrating an example of a system configuration of an information providing system according to a fifth embodiment.

FIG. 17 is a diagram illustrating an example of a system configuration of an information providing system according to a fifth embodiment. As illustrated in FIG. 17, an information providing system 100 according to the fifth embodiment includes an external server 1701, in addition to the system configuration of the information providing system 100 according to the embodiment of FIG. 1.

The external server 1701 is, for example, an information processing apparatus capable of communicating with the information providing apparatus 101 and the one or more information terminals 123 via a network such as the Internet 1702, or system including a plurality of information processing apparatuses. In the present embodiment described below, the external server 1701 is assumed to be an information processing apparatus including a hardware configuration as illustrated in FIG. 6, for example.

<Functional Configuration>

(Functional Configuration of Information Providing Apparatus)

Figure 18:
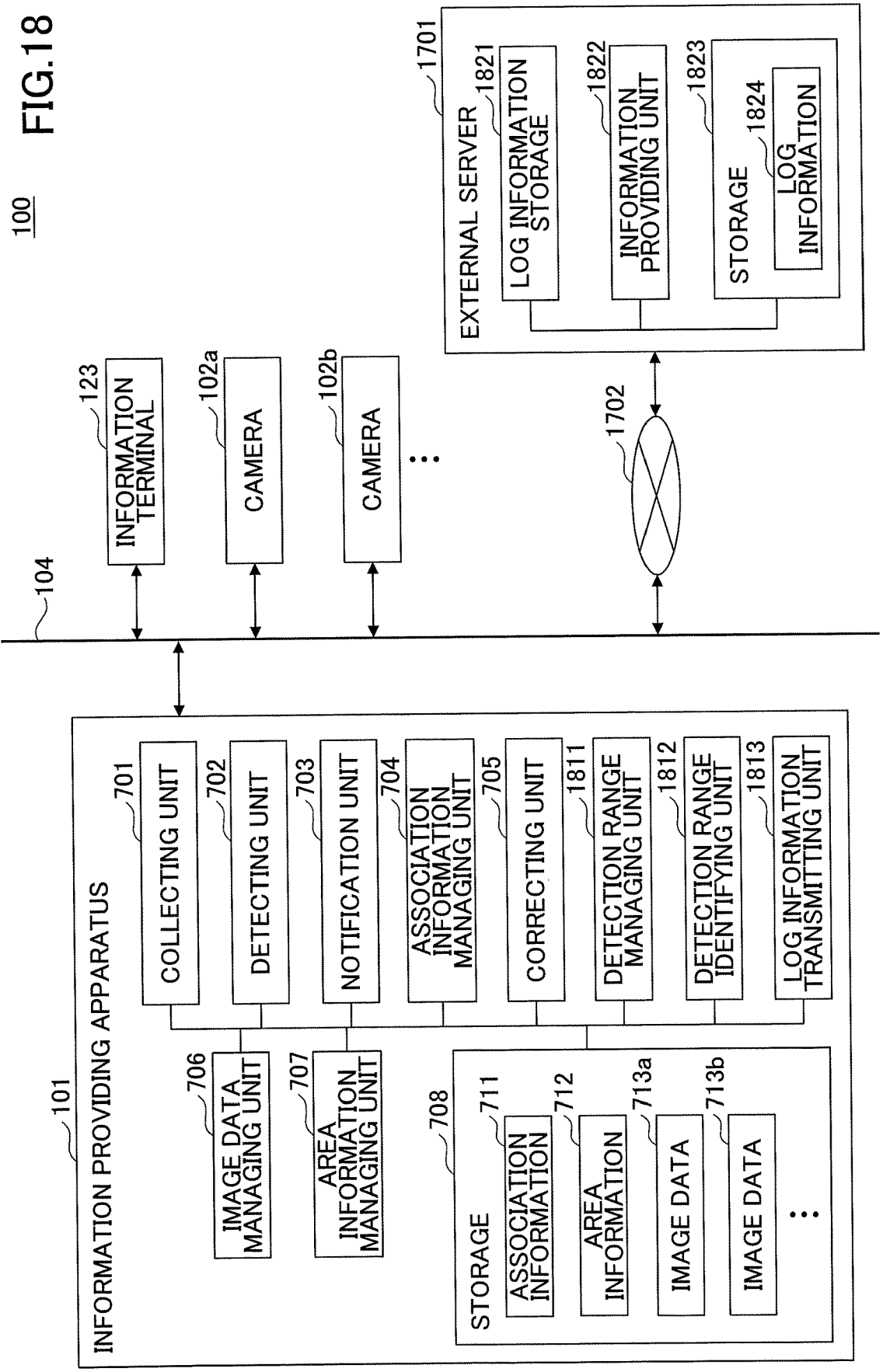
FIG. 18 is a diagram illustrating an example of a functional configuration of the information providing system according to the fifth embodiment.

FIG. 18 is a diagram illustrating an example of a functional configuration of the information providing system according to the fifth embodiment.

The information providing apparatus 101 according to the fifth embodiment includes a detection range managing unit 1811, a detection range identifying unit 1812, and a log information transmitting unit 1813 as illustrated in FIG. 18, in addition to the functional configuration of the information providing apparatus 101 according to the embodiment illustrated in FIG. 7A, for example.

Figures 19A, 19B:
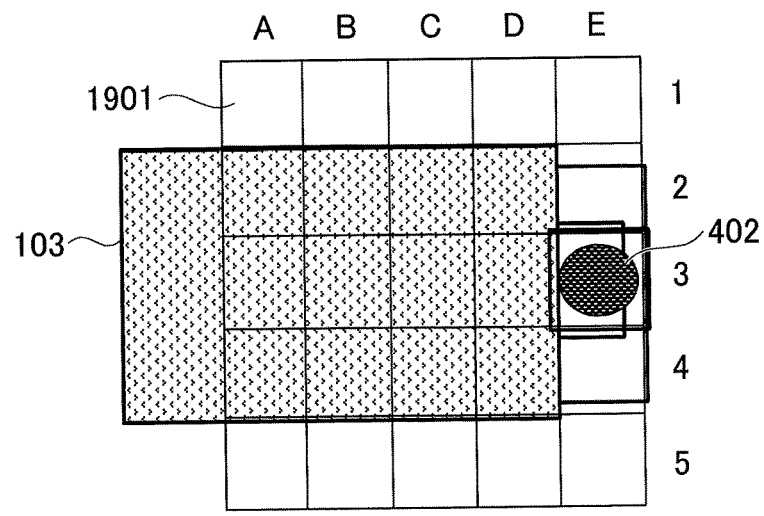
FIGS. 19A and 19B are diagrams for explaining detection frames and log information according to the fifth embodiment.

The detection range managing unit 1811 is implemented by a program executed by the CPU 601, for example. The detection range managing unit 1811 manages a detection range of an image acquired by the camera 102 by dividing the detection range into a plurality of detection frames 1901 as illustrated in FIG. 19A. FIG. 19A illustrates an example in which the detection range is divided into the plurality of detection frames 1901 having five columns A through E in a vertical direction and five rows 1 through 5 in a horizontal direction. The plurality of detection frames 1901 illustrated in FIG. 19A is merely an example. The number and the size of the detection frames 1901 may be set or changed by an administrator as desired, for example.

The detection range identifying unit 1812 is implemented by a program executed by the CPU 601, for example. The detection range identifying unit 1812 identifies, among the detection frames 1901, detection frame indicating a predetermined temperature corresponding to a temperature of the head 402 of the user 401 who uses the bed 103, and coverts the detection frame into a numerical value. In the example of FIG. 19A, the predetermined temperature corresponding to the temperature of the head 402 of the user 401 is included in a detection frame in the E column and the third row. Therefore, the detection frame in which the predetermined temperature is detected is expressed as "E3" by the detection range identifying unit 1812, for example.

The log information transmitting unit (history information transmitting unit) 1813 is implemented by a program executed by the CPU 601, for example. When the detecting unit 702 determines that the position of an identified detection frame indicating the predetermined temperature is changed, the log information transmitting unit 1813 sends, to the external server 1701, log information including camera ID for identifying the camera 102 by which the image is acquired, a time point at which the image is acquired, and the detection frame (such as "E3"). The log information is an example of history information.

Conversely, when the detecting unit 702 detects that the position of the identified detection frame indicating the predetermined temperature is not changed, the log information transmitting unit 1813 does not send log information to the external server 1701. Further, detection frame information included in log information is expressed as a short string such as "E3". Accordingly, in the present embodiment, the amount of log information transmitted by the log information transmitting unit 1813 and the storage capacity of the external server 1701 for log information can be effectively reduced.

However, the above-described example is merely a preferred example. The log information transmitting unit 1813 may be configured to transmit log information to the external server 1701 at predetermined time intervals or at predetermined times, or may be configured to additionally transmit information indicating a detection state, which will be described later.

A functional configuration other than the above-described functional configuration of the information providing apparatus 101 may be the same as the functional configuration of the information providing apparatus 101 according to the embodiment illustrated in FIG. 7A.

(Functional Configuration of External Server)

The external server 1701 implements log information storage 1821, an information providing unit 1822, and storage 1823 by causing the CPU 601 to execute predetermined programs.

The log information storage (history information storage) 1821 receives log information transmitted from the information providing apparatus 101, and stores the received log information in the storage 1823 so as to manage the received log information. Further, log information is not necessarily stored in the storage 1823. The log information storage 1821 may store log information in an external server other than the external server 1701 so as to manage the log information.

FIG. 19B illustrates an example of log information 1824 stored in the storage 1823. As illustrated in FIG. 19B, the log information 1824 stores information such as "camera ID," "time point," and "detection frame" included in log information received from the information providing apparatus 101.

The "camera ID" includes identification information for identifying the plurality of cameras 102. The camera IDs may be bed IDs for identifying the respective beds 103.

The "time point" includes information indicating time points (date and time information or time information) at which images are acquired by the cameras 102. In the example of FIG. 19B, information representing hours, minutes, and seconds are stored.

The "detection frame" includes information indicating positions of detection frames in which the predetermined temperature corresponding to the temperature of the head 402 of the user 401 is detected. In the example of FIG. 19B, the "detection frame" indicates the columns and rows of the plurality of detection frames 1901 illustrated in FIG. 19A.

For example, FIG. 19B indicates that the predetermined temperature corresponding to the temperature of the head 40 of the user 401 who uses the bed 103 corresponding to camera ID "10001" is detected in the detection frame "E3" from the time point 00:00:00 until time point 02:05:43.

Further, at the time point "02:05:43," the detection frame in which the predetermined temperature is detected is changed from "E3" to "E1," this state is continued until a time point "02:07:11".

As described, the log information 1824 stored in the storage 1823 includes detection frames in which the predetermined temperature corresponding to the temperature of the head 402 of the user 401 is detected, detected time points, duration time, and the order in which the detection frames are detected. However, information such as personal information of the user 401 is not included in the log information 1824.

Referring back to FIG. 18, a functional configuration of the external server 1701 will be described.

The information providing unit 1822 analyzes the log information 1824 in response to a request from the one or more information terminals 123 used by personnel such as nurses and caregivers in the facility, and provides an analysis result to the one or more information terminals 123. The analysis result includes various information such as state transition of the user 401 who uses the bed 103, a ratio of presence to absence, heat maps, and a time chart.

The storage 1823 is implemented by a program executed by the CPU 601, the storage 604, and the RAM 602, for example, and stores various information such as the log information 1824.

<Process Flow>

Next, a process flow of an information providing method according to the fifth embodiment will be described.

(Process for Transmitting Log Information)

FIG. 20 is a flowchart illustrating an example of a process for transmitting log information according to the fifth embodiment. This process is repeatedly performed by the log information transmitting unit 1813 on a per-frame basis each time image data is acquired by the camera 102.

In step S2001, the log information transmitting unit 1813 of the information providing apparatus 101 obtains, from the collecting unit 701, image data acquired by the camera 102.

In step S2002, the detection range identifying unit 1812 identifies a detection frame falling within a predetermined temperature range corresponding to a temperature of the head 402 of the user 401 who uses the bed 103. For example, in the example of FIG. 19A, the detection frame "E3" indicating a predetermined temperature corresponding to the temperature of the head 402 of the user 401 is identified.

In step S2003, the detecting unit 702 determines whether the position of the currently identified detection frame by the detection range identifying unit 1812 differs from the position of the previously identified detection frame.

When the detecting unit 702 determines that the position of the currently identified detection frame differs from the position of the previously identified detection frame, the log information transmitting unit 1813 causes the process to proceed to step S2004. Conversely, when the detecting unit 702 determines that the position of the currently identified detection frame is the same as the position of the previously identified detection frame, the log information transmitting unit 1813 ends the process.

In step S2004, the log information transmitting unit 1813 transmits, to the external server 1701, log information including a camera ID of the camera by which the image data is acquired, a time point at which the image data is acquired, and the detection frame identified in step S2002.

The process for transmitting log information illustrated in FIG. 20 is merely an example. As described, the log information transmitting unit 1813 may be configured to transmit log information to the external server 1701 at predetermined time intervals or at predetermined times, regardless of a change in the position of an identified detection frame.

(Process Performed by External Server)

Figure 21:
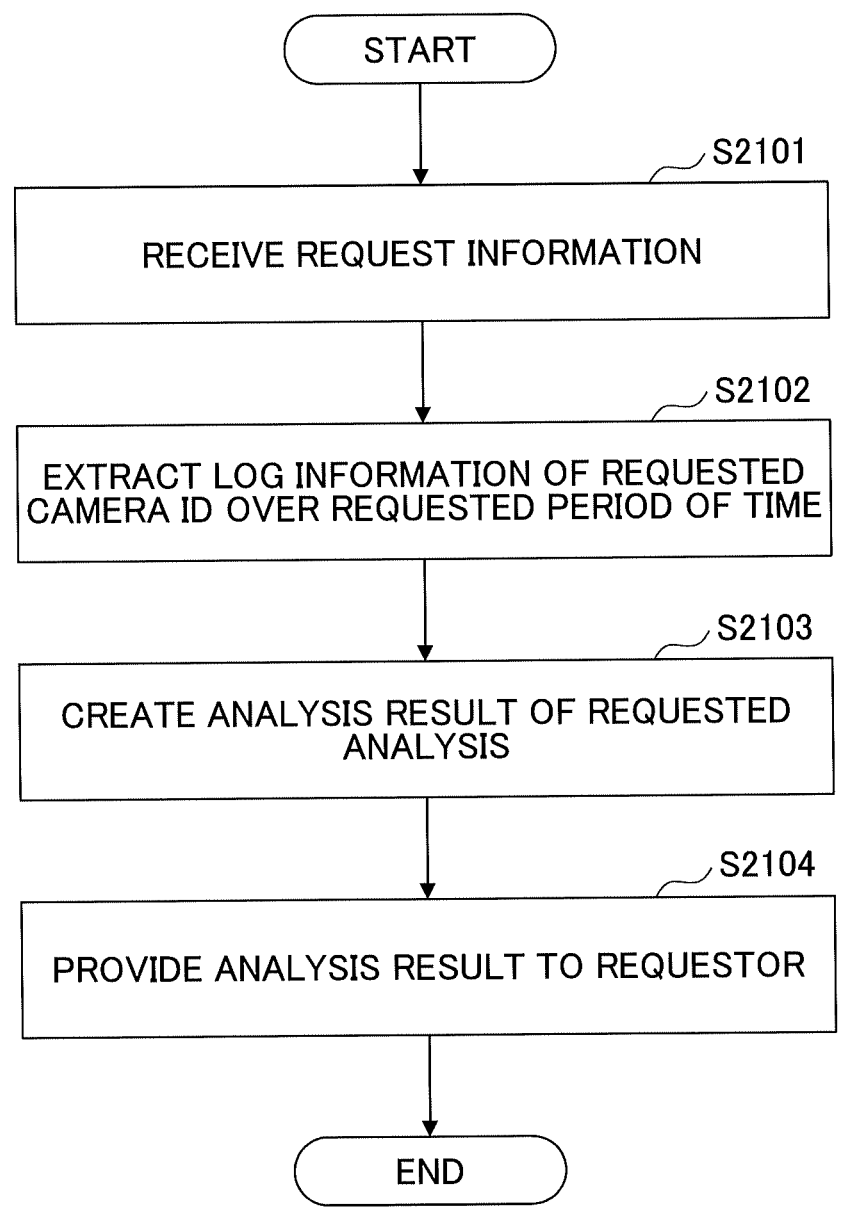
FIG. 21 is a flowchart illustrating an example of a process performed by an external server according to the fifth embodiment.

FIG. 21 is a flowchart illustrating an example of a process performed by the external server according to the fifth embodiment. The external server 1701 repeatedly performs the process illustrated in FIG. 21, for example.

In step S2101, upon receiving request information for requesting to provide information from the one or more information terminals 123, for example, the external server 1701 performs the process as of step S2102.

In response to an operation by a nurse, a caregiver, or other personnel, the request information is transmitted from the corresponding information terminal 123. The request information is for requesting to provide various information such as state transition of the user 401 who uses the bed 103, a ratio of presence to absence of the user 401, heat maps, and a time chart. The request information includes, for example, a camera ID (or a bed ID) of the target camera 102, a target period of time, and details of analysis.

In step S2102, the information providing unit 1822 of the external server 1701 extracts, from the log information 1824 stored in the storage 1823, log information of the target camera ID over the target period of time indicated by the request information.

In step S2103, the information providing unit 1822 analyzes the extracted log information and creates an analysis result of the requested analysis. In step S2104, the information providing unit 1822 provides or transmits the analysis result to the information terminal 123 from which the request is made or causes the information terminal 123 from which the request is made to display the analysis result.

FIGS. 22A and 22B, FIGS. 23A through 23C, and FIG. 24 are diagrams for explaining examples of analysis results according to the fifth embodiment.
(Transition of Detection States)

FIG. 22A is a diagram for illustrating detection states of the user 401 who uses the bed 103. Specifically, FIG. 22A illustrates relationships between the detection states and detection frames in which a temperature corresponding to a temperature of the head 402 of the user 401 who uses the bed 103 (herein after referred to as the "user's head") is detected.

In the example of FIG. 22A, a detection state in which the "user's head" is detected in the detection frame "E3" is regarded as a "sleeping state".

Further, in FIG. 22A, the detection frames "B3" and "C3" both indicate a "getting-up state". This means that a detection state detected in at least one of the detection frames "B3" and "C3" is regarded as the "getting-up state".

In FIG. 22A, the detection frames "B2" and "C2" indicate both a detection state "perched-on-bed state" and a detection state "sitting-on-bed state". In the example of FIG. 22A, for example, when the "user's head" is detected in the detection frame "B2," the information providing unit 1822 determines a detection state as either one of the detection states by checking a detection sequence such as transition of previous detection states (or transition of detection frames). For example, when the "user's head" is detected in the detection frame "B2" after an "absence state" or a "leaving-bed state," the information providing unit 1822 determines a detection state as the "sitting-on-bed state". Conversely, when the "user's head" is detected in the detection frame "B2" after the "sleeping state" or a "fall risk state," the information providing unit 1822 determines a detection state as the "perched-on-bed state".

Further, in FIG. 22A, detection frames "B1" and "C1" indicate both the detection state "leaving-bed state" and a detection state "fall state". In the example of FIG. 22A, when the "user's head" is detected in a detection frame "C1", the information providing unit 1822 determines a detection state based on the duration of the state. For example, when the duration during which the "user's head" remains in the detection frame "C1" is less than a predetermined period of time (1 to 5 minutes, for example), the information providing unit 1822 determines a detection state as the "leaving-bed state". Conversely, when the duration during which the "user's head" remains in the detection frame "C1" is greater than or equal to the predetermined period of time, the information providing unit 1822 determines the detection state as the "fall state".

Further, in the example of FIG. 22A, a state in which the user's head is not detected in any of the detection frames is regarded as the "absence state". The relationships between the detection frames and the detection states, and also the number and the size of the detection frames illustrated in FIG. 22A are merely examples, and may be set or changed by an administrator as desired, for example.

By making use of the relationships between the detection frames and the detection states as illustrated in FIG. 22A and the log information 1824 as illustrated in FIG. 19B, the information providing unit 1822 can create an analysis result as illustrated in FIG. 22B and provide the analysis result to the information terminal 123 from which the request is made.

FIG. 22B illustrates an example of an analysis result indicating transition of the detection states. In the example of FIG. 22B, the "user's head" is detected in the detection frame "E3" at a time point "00:00:00 (0 hours, 0 minutes, 0 seconds)," and a detection state is determined as the "sleeping state".

Further, the "user's head" is detected in the detection frame "E1" at a time point "02:05:43 (2 hours, 5 minutes, 43 seconds)," and a detection state is determined as a "fall risk state". Further, the "time point" and "detection frame" information is updated when a change in the position of a detection frame is detected by performing the process for transmitting log information illustrated in FIG. 20. Therefore, as can be seen from FIG. 22B, the "sleeping state" is continued from the time point "00:00:00" until the time point "02:05:43".

Further, in the analysis result, when the "user's head" is detected in the detection frames "B2" and "C2" at a time point "05:35:40," a detection state is determined as the "perched-on-bed state" by the information providing unit 1822 because the previously detected detection state is the "getting-up state". Also, when the "user's head" is detected in the detection frame "C1" at a time point "05:35:49," a detection state is determined as the "sitting-on-bed state" by the information providing unit 1822 because the previously detected detection state is the "absence state".

Accordingly, the information providing unit 1822 can create and provide information representing transition of detection states of the user 401 who uses the bed 103. The information representing transition of detection states is an example of an analysis result created and provided by the information providing unit 1822.
(Ratio of Presence to Absence)

Figure 23A:
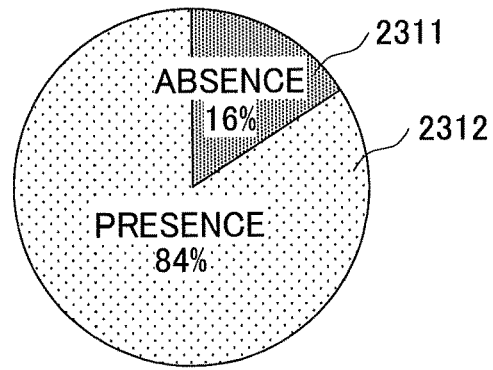
FIGS. 23A through 23C are diagrams for explaining examples of analysis results according to the fifth embodiment.

FIG. 23A illustrates an example of an analysis result of a "ratio of presence to absence" created and provided by the information providing unit 1822. The example of FIG. 23A illustrates the analysis result representing the ratio of presence 2312 to absence 2311 of the user 401 using the bed 103. For example, the ratio of absence 2311 can be calculated by analyzing a ratio of total time of the "absence state" of the log information 1824 over the target period of time indicated by the request information received from the information terminal 123.

Accordingly, the information providing unit 1822 can create and provide information representing a ratio of presence to absence of the user 401 using the bed 103. The information representing the ratio of presence to absence of the user 401 is an example of an analysis result created and provided by the information providing unit 1822.
(Heat Map)

Figure 23B:
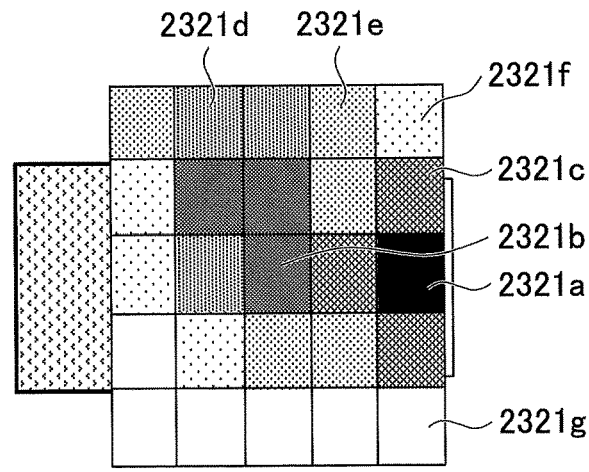

FIG. 23B illustrates an example of an analysis result of a "heat map of lengths of time" created and provided by the information providing unit 1822. In the heat map of lengths of time illustrated in the example of FIG. 23B, the lengths of time during which the user's head is detected in each detection frame are visualized as seven colors 2321a through 2312g. In FIG. 23B, the length of time during which the "user's head" is detected is longer in the order of the colors 2321a, 2321b, . . . and 2321g.

From the heat map of lengths of time illustrated in FIG. 23B, it is seen that the "user's head" is detected for the longest length of time in the detection frame "E3," and the "user's head" is detected for the shortest period of time in the detection frames "A4," "A5," "B5," "C5," "D5," and "E5".

Figure 23C:
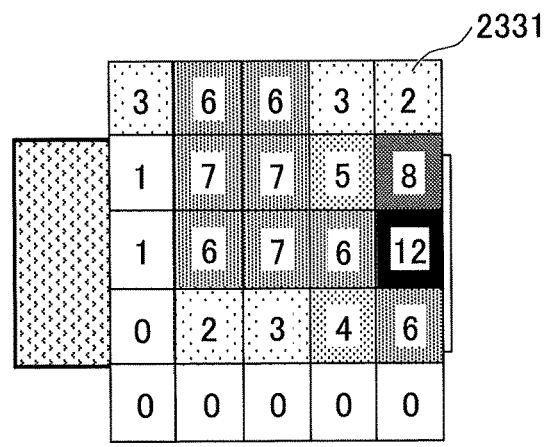

FIG. 23C illustrates an example of an analysis result of a "heat map of frequency of movements" created and provided by the information providing unit 1822. The heat map of frequency of movements is information that visualizes the frequency at which the "user's head" is detected or the number of times the "user's head" is detected in each detection frame 2331. The heat map of frequency of movements is another example of a heat map created and provided by the information providing unit 1822.

As an example, the heat map of frequency of movements is visualized by representing, as colors, the frequency at which the user's head is moved to each of the detection frames 2331, similarly to FIG. 23B, for example.

Also, as another example, the heat map of frequency of movements may be visualized by representing, as numerical values, the number of times the "user's head" is moved to each of the detection frames 2331.

Further, as illustrated in FIG. 23B, for example, the heat map of frequency of movements may be visualized by representing, as colors, the frequency at which the "user's head" is moved to each of the detection frames 2331, while also representing, as numerical values, the number of times the "user's head" is moved to each of the detection frames 2331.

The frequency and the number of times of detection of the "user's head" can be determined by calculating the rate at which the "user's head" is moved to and the number of times the "user's head" is moved to each detection frame over a predetermined period of time, based on information of time points and detection frames included in an analysis result indicating transition of detection states as illustrated in FIG. 22B, for example.

Accordingly, the information providing unit 1822 can create and provide heat maps by visualizing lengths of time in which the user 401 using the bed 103 is detected in each detection frame, frequency at which the user 401 is detected in each detection frame, and the number of times the user 401 is detected in each detection frame. The heat maps are examples of analysis results created and provided by the information providing unit 1822.

Such heat maps can visualize the trend of how the head of each user is detected in detection frames. For example, it is assumed that heat maps allow personnel such as nurses and caregivers to predict potential problems (such as a fall, an injury, and a wandering behavior), and prevent or reduce the potential problems in advance.

Further, it is conceived that a service using such heat maps may be provided as described below, for example. A service provider, providing the external server 1701, analyzes a plurality of pieces of log information 1824 stored in the external server 1701 so as to create a dictionary containing correspondence relationships between problems happening in the past and heat maps immediately before the problems.

For example, personnel such as nurses and caregivers in the facility each capture an image of a heat map as illustrated in FIG. 23B by using a smartphone on which an application compatible with the information providing system 100 is installed. By using the application installed on the smartphone, when a heat map associated with a problem happening in the past is found in the above-described dictionary, a potential problem and its countermeasure are displayed on a display screen of the smartphone.

By providing such a service, it becomes possible for personnel such as nurses and caregivers to more accurately grasp a state of the user 401 who uses the bed 103 placed in the facility.

(Time Chart)

Figure 24:
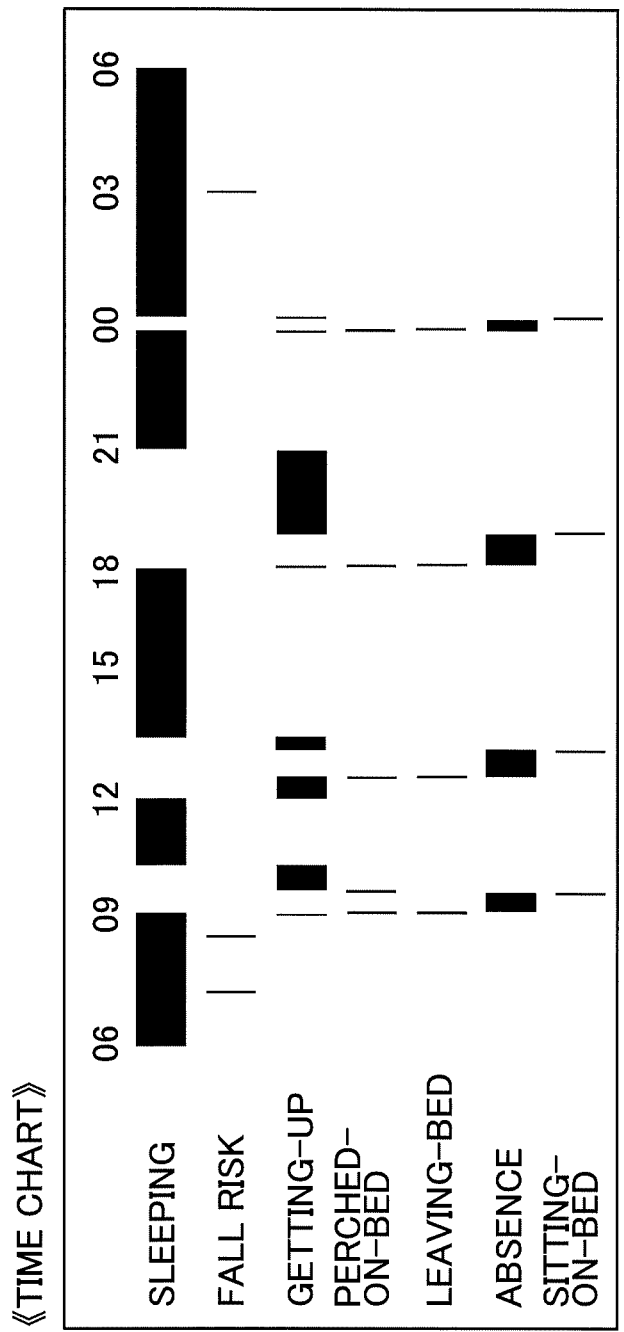
FIG. 24 is a diagram for explaining an example of an analysis result according to the fifth embodiment.

FIG. 24 illustrates an example of an analysis result of a "time chart" created and provided by the information providing unit 1822. FIG. 24 illustrates the time chart in which detection states of the user 401 using the bed 103 are visualized and displayed as time. In FIG. 24, a horizontal axis represents time, and rectangles (or lines) on the horizontal axis represent time ranges in which each of the detection states indicated on the vertical axis is detected. Such a time chart allows personnel such as nurses and caregivers in the facility to easily grasp states of the user 401 using the bed 103 detected at certain times.

Accordingly, the information providing unit 1822 can create and provide a time chart that visualizes and displays states of the user 401 using the bed 103 detected at certain times. Further, the time chart is an example of an analysis result created and provided by the information providing unit 1822.

The analysis results illustrated in FIGS. 22A and 22B and FIGS. 23A through 23C are merely examples. In addition to the above-described analysis results, the information providing unit 1822 can create and provide various analysis results by using the log information 1824.

According to the information providing system 100 of the present embodiment, it is possible to grasp states of the user 401 who uses the bed 103 placed in the facility, and store the states converted into numerical values so as to provide analysis results in which "previous states" of the user 401 are visualized. Accordingly, in a case where any previous state of the user 401 using the bed 103 indicates a sign of an accident or a risk similar to that happened in the past, personnel such as nurses and caregivers can take an action to prevent a potential accident or a potential risk.

The system configuration of the information providing system 100 illustrated in FIG. 17 and the functional configuration of the information providing system 100 illustrated in FIG. 18 are merely examples. The information providing system 100 according to the present embodiment can employ other various system configurations and functional configurations.

The functional configuration of the external server 1701 may be implemented by, for example, an information processing apparatus coupled to, the network 104. Further, the information providing apparatus 101 and the nurse call system 121 may be integrated into a single information processing apparatus. Further, at least a part of the functional configuration of the external server 1701 may be included in the information providing apparatus 101 or the nurse call system 121.

Further, the information providing unit 1822 of the external server 1701 may be configured to provide part of or the entirety of the log information 1824 stored in the storage 1823, in accordance with request information transmitted from the information terminal 123. In this case, for example, by using an application of the information terminal 123, log information may be analyzed and various analysis results as illustrated in FIGS. 22A and 22B and FIGS. 23A through 23C may be created and displayed.

Further, the information providing unit 1822 of the external server 1701 may be provided on the information terminal 123 side. In this case, the information terminal 123 may transmit request information to the external server 1701 and obtain log information from the log information storage 1821 of the external server 1701. By using the function of the information providing unit 1822, the information terminal 123 can analyze the obtained log information and display an analysis result on the display screen.

According to at least one embodiment, it becomes possible to accurately grasp states of users who use beds placed in a facility such as a medical facility or a nursing facility.

Further, the present invention is not limited to these embodiments, but various variations and modifications may be made without departing from the scope of the present invention.

What is claimed is:

1. An information providing apparatus for providing information of a user who uses a bed placed in a facility, the information providing apparatus comprising:
   a memory; and
   a processor coupled to the memory and configured to
   collect image data indicating temperatures on the bed and temperatures around the bed from an acquisition device, the image data being acquired by the acquisition device,
   detect, based on the collected image data, a change of a given temperature in one or more areas preset on the bed and around the bed, and
   send the information of the user to a predetermined notification destination, based on the change of the given temperature indicated by the image data in the one or more areas detected as corresponding to a preset pattern of a change of the given temperature,
   wherein the one or more areas includes a first area for detecting the user falling out of the bed, accompanied by the preset pattern of the change of the given temperature, and
   the processor is further configured to send the information of the user to the notification destination, in a case where after the preset pattern of the change of the given temperature is detected in the first area, no change of the given temperature indicated by the image data is detected beyond a predetermined period of time, and
   the processor is further configured to stop sending the information of the user to the notification destination, in a case where after a temperature corresponding to the user's temperature becomes no longer detected in the one or more areas, and subsequently a change of the temperature is detected in the one or more areas again, no preset pattern of a change of the temperature is detected in the first area within a predetermined period of time.

2. The information providing apparatus according to claim 1, the one or more areas further includes a second area for detecting a risk of the user falling out of the bed, and
   the processor is further configured to send the information of the user to the notification destination, upon a temperature corresponding to the user's temperature being detected in the second area.

3. The information providing apparatus according to claim 2, wherein the processor is further configured to send the information of the user to the notification destination, in a case where after the temperature corresponding to the user's temperature becomes no longer detected in the one or more areas, a change of the temperature is detected in the one or more areas again, and after the change of the temperature is moved from the first area to the bed, the change of the temperature is detected as having moved back to the first area or as having remained in the second area beyond the predetermined period of time again.

4. The information providing apparatus according to claim 1, wherein
   the one or more areas include subareas obtained by dividing the one or more areas into a plurality of areas; and
   the processor is further configured to detect a change of a temperature corresponding to a temperature of the user, based on a change of the continuous subareas indicating body temperature and a size of a person.

5. The information providing apparatus according to claim 1, wherein the information of the user includes information for identifying at least one of the bed, a position at which the bed is placed, the acquisition device, and the user.

6. The information providing apparatus according to claim 1, wherein the information of the user includes one or more pieces of image data collected within a predetermined period of time before the preset pattern of the change of the given temperature is detected.

7. The information providing apparatus according to claim 1, wherein the processor is further configured to manage association information that associates the preset pattern of the change of the given temperature with a notification description of the preset pattern of the change.

8. The information providing apparatus according to claim 1, wherein
   the facility is a medical facility or a nursing facility, and
   the notification destination is a nurse call system compatible with the facility.

9. The information providing apparatus according to claim 1, wherein the processor is further configured to correct a position of the one or more areas in accordance with a change in a position of the bed.

10. The information providing apparatus according to claim 1, wherein the predetermined period of time is a period of time set for each of the first area and a second area.

11. The information providing apparatus according to claim 1, wherein the processor is further configured to transmit, to a predetermined external device, upon the change of the given temperature in the one or more areas being detected, history information including information of the one or more areas in which the given temperature is detected, the given temperature corresponding to a temperature of the user.

12. An information providing apparatus for providing information of a user who uses a bed placed in a facility, the information providing apparatus comprising:
    a memory; and
    a processor coupled to the memory and configured to
    collect image data indicating temperatures on the bed and temperatures around the bed from an acquisition device, the image data being acquired by the acquisition device,
    detect, based on the collected image data, a change of a given temperature in one or more areas preset on the bed and around the bed, and
    display, upon the change of the given temperature indicated by the image data in the one or more areas being detected as corresponding to a preset pattern of a change of the given temperature, the information of the user on a predetermined display device, wherein the one or more areas includes a first area for detecting the user falling out of the bed, accompanied by the preset pattern of the change of the given temperature, the processor is further configured to send the information of the user to the notification destination, in a case where after the preset pattern of the change of the given temperature is detected in the first area, no change of the given temperature indicated by the image data is detected beyond a predetermined period of time, and the processor is further configured to stop sending the information of the user to the notification destination, in a case where after a temperature corresponding to the user's temperature becomes no longer detected in the one or more areas, and subsequently a change of the temperature is detected in the one or more areas again, no preset pattern of a change of the temperature is detected in the first area within a predetermined period of time.

13. An information providing system for providing, by a plurality of information providing apparatuses, information of a user who uses a bed placed in a facility, the information providing system comprising;

a memory; and a processor coupled to the memory and configured to collect image data indicating temperatures on the bed and temperatures around the bed from an acquisition device, the image data being acquired by the acquisition device, detect, based on the collected image data, a change in location of a given temperature in one or more areas preset on the bed and around the bed, send, upon the change of the given temperature indicated by the image data in the one or more areas being detected as corresponding to a preset pattern of a change of the given temperature, the information of the user to a predetermined notification destination, and display the information of the user on a predetermined display device, wherein the one or more areas includes a first area for detecting the user falling out of the bed, accompanied by the preset pattern of the change of the given temperature, the processor is further configured to send the information of the user to the notification destination, in a case where after the preset pattern of the change of the given temperature is detected in the first area, no change of the given temperature indicated by the image data is detected beyond a predetermined period of time, and the processor is further configured to stop sending the information of the user to the notification destination, in a case where after a temperature corresponding to the user's temperature becomes no longer detected in the one or more areas, and subsequently a change of the temperature is detected in the one or more areas again, no preset pattern of a change of the temperature is detected in the first area within a predetermined period of time.

14. The information providing system according to claim 13, wherein the processor is further configured to transmit, upon the change of the given temperature in the one or more areas being detected, history information including information of the one or more areas in which the given temperature is detected, the given temperature corresponding to a temperature of the user, store the transmitted history information, and provide, based on the stored history information, an analysis result indicating a state of the user.

15. The information providing apparatus according to claim 1, wherein the one or more areas includes a first area for detecting the user falling out of the bed, accompanied by the preset pattern of the change of the given temperature, and the processor is further configured to send the information of the user to the notification destination, in a case no change of the given temperature indicated by the image data is detected beyond a predetermined period of time after the preset pattern of the change of the given temperature is detected in the first area for detecting the user falling out of the bed.

16. The information providing apparatus according to claim 15, wherein the processor is further configured to exclude an area that is smaller than a predetermined size from a target of detecting the change of the given temperature.

* * * * *